US012658333B2

(12) United States Patent
Itou et al.

(10) Patent No.: US 12,658,333 B2
(45) Date of Patent: Jun. 16, 2026

(54) CHEMICAL DECONTAMINATION METHOD AND CHEMICAL DECONTAMINATION APPARATUS

(71) Applicant: Hitachi-GE Nuclear Energy, Ltd., Hitachi (JP)

(72) Inventors: Tsuyoshi Itou, Tokyo (JP); Kazushige Ishida, Tokyo (JP); Hideyuki Hosokawa, Tokyo (JP); Shintaro Yanagisawa, Hitachi (JP); Takashi Oohira, Hitachi (JP)

(73) Assignee: Hitachi GE Vernova Nuclear Energy, Ltd., Hitachi (JP)

( * ) Notice: Subject to any disclaimer, the term of this patent is extended or adjusted under 35 U.S.C. 154(b) by 536 days.

(21) Appl. No.: 18/269,305

(22) PCT Filed: Oct. 29, 2021

(86) PCT No.: PCT/JP2021/039978
§ 371 (c)(1),
(2) Date: Jun. 23, 2023

(87) PCT Pub. No.: WO2022/153646
PCT Pub. Date: Jul. 21, 2022

(65) Prior Publication Data

US 2024/0071640 A1 Feb. 29, 2024

(30) Foreign Application Priority Data

Jan. 12, 2021 (JP) ................................. 2021-002981

(51) Int. Cl.
*G21F 9/00* (2006.01)

(52) U.S. Cl.
CPC .................................... *G21F 9/002* (2013.01)

(58) Field of Classification Search
CPC . G21F 9/002; G21F 9/004; G21F 9/28; G21C 19/02; G21D 1/00
See application file for complete search history.

(56) References Cited

U.S. PATENT DOCUMENTS 6,613,153 B1 * 9/2003 Bertholdt ................ G21F 9/004 588/1
2002/0099252 A1 7/2002 Nagase et al.

FOREIGN PATENT DOCUMENTS

JP 2000-105295 A 4/2000
JP 2003-90897 A 3/2003
(Continued)

OTHER PUBLICATIONS

International Search Report (PCT/ISA/210) issued in PCT Application No. PCT/JP2021/039978 dated Dec. 21, 2021 with English translation (4 pages).
(Continued)

*Primary Examiner* — Daniel Berns
*Assistant Examiner* — Joshua Maxwell Speer
(74) *Attorney, Agent, or Firm* — Crowell & Moring LLP

(57) ABSTRACT

Provided is a chemical decontamination method that shortens the decomposition time of a reduction decontamination agent. An oxidization decontamination, a decomposition of an oxidization decontamination agent, and reduction decontamination using an oxalic acid aqueous solution are performed on a target piping of a BWR plant. After that, the oxalic acid is decomposed (S7). That is, a part of the oxalic acid is decomposed by irradiating the oxalic acid aqueous solution with ultraviolet rays upstream of a decomposition device (S8), and $Fe^{3+}$ in the aqueous solution is converted to $Fe^{2+}$. Hydrogen peroxide is supplied to the decomposition device (S9). In the decomposition device, the oxalic acid is decomposed by a catalyst and hydrogen peroxide, $Fe^{2+}$ and hydrogen peroxide react to produce $Fe^{3+}$ and OH*, and the
(Continued)

oxalic acid is decomposed by OH*. A corrosion potential of the aqueous solution flowing out from the decomposition device is measured (S11). A concentration ratio calculation device obtains $Fe^{3+}/Fe^{2+}$ (concentration ratio) based on the corrosion potential (S12), and A control device controls the supply amount of hydrogen peroxide to the decomposition device based on $Fe^{3+}/Fe^{2+}$ (S14 and S16).).

16 Claims, 10 Drawing Sheets

(56) References Cited

FOREIGN PATENT DOCUMENTS

| | | | |
|---|---|---|---|
| JP | 2013-95623 | A | 5/2013 |
| JP | 2017-138139 | A | 8/2017 |
| JP | 2018-159647 | A | 10/2018 |
| JP | 2019-529879 | A | 10/2019 |
| WO | WO 2019/007788 | A1 | 1/2019 |

OTHER PUBLICATIONS

Japanese-language Written Opinion (PCT/ISA/237) issued in PCT Application No. PCT/JP 2021/039978 dated Dec. 21, 2021 (3 pages).

* cited by examiner

CHEMICAL DECONTAMINATION METHOD AND CHEMICAL DECONTAMINATION APPARATUS

TECHNICAL FIELD

The present invention relates to a chemical decontamination method and a chemical decontamination apparatus, and particularly, to the chemical decontamination method and the chemical decontamination apparatus suitable for application to a boiling water nuclear power plant.

BACKGROUND ART

For example, a boiling water nuclear power plant (hereinafter referred to as a BWR plant) has a nuclear reactor in which a core is built in a reactor pressure vessel (hereinafter referred to as an RPV). Reactor water supplied to the core by a recirculation pump (or an internal pump) is heated by heat generated by nuclear fission of nuclear fuel material in a fuel assembly loaded into the core, and a portion thereof becomes steam. The steam is directed from the RPV to a turbine to rotate the turbine. The steam discharged from the turbine is condensed in a condenser to become water. This water is supplied to the RPV as a feed water. Metal impurities are mainly removed from the feed water by a filtration demineralizer provided in the feed water piping, in order to suppress generation of radioactive corrosive products in the RPV. The reactor water is a cooling water present in the RPV.

Corrosion products which are the source of the radioactive corrosion products are generated on the reactor water of components of BWR plant such as RPV and a recirculation system piping, etc., and therefore stainless steels such as stainless steels and nickel-based alloys, etc. which are less corrosive are used as main primary components. In addition, the RPV made of a low alloy steel has a stainless-steel overlay on its inner surface to prevent the low alloy steel from contacting the reactor water directly. Furthermore, a portion of the reactor water is purified by a filtration demineralizer in a reactor cleanup system to actively remove metal impurities that are slightly present in the reactor water.

However, even if the above-described anti-corrosion measures are taken, the presence of a very small amount of metal impurities in the reactor water cannot be avoided. Thus, some of the metal impurities adhere to the surface of the fuel rod included in the fuel assembly as a metal oxide. The impurities (e.g., metal elements) adhering to the surface of the fuel rod undergo nuclear reactions by irradiation of neutrons released by nuclear fission of the nuclear fuel material in the fuel rod, and become radionuclides such as cobalt 60, cobalt 58, chromium 51, and manganese 54.

These radionuclides remain mostly adhering to the surface of the fuel rod in the form of oxides. However, some radionuclides elute as ions in the reactor water depending on the solubility of the incorporated oxide, or are re-released into the reactor water as insoluble solids called crud. The radioactive material contained in the reactor water is removed by the reactor cleanup system connected to the RPV. The radioactive material that has not been removed in the reactor cleanup system is accumulated on a surface of a component (for example, a pipe) of the nuclear power plant in contact with the reactor water while circulating in the recirculation system or the like together with the reactor water. As a result, radiation is radiated from the surface of the component, which causes radiation exposure to workers during regular inspection work.

The exposure dose of the worker is controlled so as not to exceed the prescribed value for each worker. In recent years, this standard has been lowered, creating a need to keep the exposure dose of each person as low as possible.

Therefore, when the exposure dose in the assay operation is expected to be high, a chemical decontamination is performed to dissolve and remove the radionuclide adhering to the piping.

For example, Japanese Patent Application Laid-Open No. 2000-105295 describes that reduction decontamination with a reduction decontamination solution containing oxalic acid (reduction decontamination agent) and hydrazine is performed on the surface of a chemical decontamination object (for example, a pipe) of a nuclear power plant, the reduction decontamination agent contained in the reduction decontamination solution used for the reduction decontamination is decomposed, and oxidation decontamination using an oxidation decontamination solution containing an oxidation decontamination agent such as potassium permanganate is performed on the surface. In the step of decomposing the reduction decontamination agent, oxalic acid which is a reduction decontamination agent is decomposed in a decomposition device fed with hydrogen peroxide, the decomposition device having a catalyst, and is further decomposed by ultraviolet rays irradiation to a reduction decontamination solution in an ultraviolet rays irradiation device arranged in parallel with the decomposition device. The ultraviolet rays irradiation to the reduction decontamination solution reduces a trivalent iron complex generated by the reduction decontamination with the reduction decontamination solution to $Fe^{2+}$ along with the decomposition of oxalic acid. Since $Fe^{2+}$ generated by the reduction is removed in the cation exchange resin column, the trivalent iron complex which is a cation, which has reached the inside of a decomposition device is precipitated on the surface of the catalyst in the decomposition device, and the life of the catalyst is prevented from being shortened.

In the chemical decontamination method of the nuclear power plant described in Japanese Patent Application Laid-Open No. 2018-159647, in order to reduce $Fe^{3+}$ contained in an oxalic acid aqueous solution to $Fe^{2+}$, the oxalic acid aqueous solution is irradiated with ultraviolet rays in an ultraviolet rays irradiation device, and the oxalic acid aqueous solution irradiated with the ultraviolet rays is supplied to a cation exchange resin column, whereby $Fe^{2+}$ contained in the oxalic acid aqueous solution is removed by the cation exchange resin column. The oxalic acid aqueous solution from which $Fe^{2+}$ has been removed is supplied to a decomposition device to which hydrogen peroxide is supplied, and the oxalic acid is decomposed in the decomposition device. Since $Fe^{3+}$ is reduced to $Fe^{2+}$ by irradiation with ultraviolet rays, iron ions ($Fe^{2+}$) adsorbed to the cation exchange resin in the cation exchange resin column increase. $Fe^{3+}$ is not adsorbed on the cation-exchange resin. The oxalic acid aqueous solution irradiated with the ultraviolet rays and passed through the cation exchange resin column is supplied to a decomposition device in which a catalyst is present and hydrogen peroxide is supplied, and the oxalic acid contained in the oxalic acid aqueous solution is decomposed by the action of the catalyst and hydrogen peroxide in the decomposition device.

CITATION LIST

Patent Literature

Patent Literature 1: Japanese Patent Application Laid-Open No. 2000-105295

Patent Literature 2: Japanese Patent Application Laid-Open No. 2018-159647

SUMMARY OF INVENTION

Technical Problem

Conventional chemical decontamination methods include a step of decomposing oxalic acid which is a reduction decontamination agent by using the action of hydrogen peroxide and a catalyst. In the chemical decontamination method including the decomposition step of the reduction decontamination agent, when hydrogen peroxide is excessively supplied to the oxalic acid aqueous solution during the decomposition of the oxalic acid, hydrogen peroxide is contained in the oxalic acid aqueous solution flowing out of the decomposition device. Therefore, when the oxalic acid aqueous solution containing hydrogen peroxide flows into the cation exchange resin column, the hydrogen peroxide comes into contact with the cation exchange resin in the cation exchange resin column, causing a problem of deterioration of the cation exchange resin.

In order to avoid deterioration of the cation exchange resin in the cation exchange resin column, it is necessary to control the amount of hydrogen peroxide supplied to the decomposition device so that hydrogen peroxide is not contained in the oxalic acid aqueous solution discharged from the decomposition device. Therefore, in the decomposition step of the reduction decontamination agent, the oxalic acid aqueous solution is periodically sampled on the downstream side of the decomposition device, and the sampled oxalic acid aqueous solution is analyzed in a hot laboratory, and the hydrogen peroxide concentration of the oxalic acid aqueous solution discharged from the decomposition device is measured. If hydrogen peroxide is contained in the oxalic acid aqueous solution discharged from the decomposition device, it is necessary to reduce the amount of hydrogen peroxide supplied to the decomposition device.

In order to adjust the amount of hydrogen peroxide supplied to such a decomposition device, it is necessary to sample and analyze the oxalic acid aqueous solution. For this reason, the time required for the decomposition step of the reduction decontamination agent becomes longer.

An object of the present invention is to provide a chemical decontamination method and a chemical decontamination apparatus capable of shortening a time required for decomposition of a reduction decontamination agent.

Solution to Problem

A feature of the present invention that achieves the above object is to perform a reduction decontamination of constituent members of a nuclear power plant by bringing an aqueous solution of a reduction decontamination agent into contact with a surface of the constituent members, the surface being in contact with reactor water, and in the step of decomposing the reduction decontamination agent contained in the aqueous solution, to measure a corrosion potential of the aqueous solution discharged from the decomposition device to which an oxidizing agent is supplied, to determine a concentration ratio of $Fe^{3+}$ relative to $Fe^{2+}$ of the aqueous solution, based on the measured corrosive potential, and to control the amount of the oxidizing agent supplied to the decomposition device, based on the concentration ratio.

The concentration ratio ($Fe^{3+}/Fe^{2+}$) of $Fe^{3+}$ to $Fe^{2+}$ of the aqueous solution discharged from the decomposition device that supplies the oxidizing agent is determined based on the measured corrosion potential, and the amount of the oxidizing agent supplied to the decomposition device is controlled based on the determined concentration ratio. Thus, the time required for decomposition of the reduction decontamination agent can be significantly shortened.

A closed loop including a first piping and a second piping is formed by connecting a second piping different from the first piping to a first piping to be chemically decontaminated, which is a constituent member of a nuclear power plant, which is communicated to a reactor pressure vessel, an aqueous solution containing a reduction decontamination agent is supplied from the second piping to the first piping, and the reduction decontamination is performed on an inner surface of the second piping, in the step of decomposing the reduction decontamination agent contained in the aqueous solution, to measure a corrosion potential of an aqueous solution that is communicated to the second piping and returned from the first piping to the second piping, and an aqueous solution discharged from the decomposition device to which an oxidizing agent is supplied, to determine a concentration ratio of $Fe^{3+}$ relative to $Fe^{2+}$ of the aqueous solution based on the measured corrosive potential, to control the supply amount of the oxidizing agent to the decomposition device based on the concentration ratio. Thereby, the above-described object can also be achieved.

The above-described object can also be achieved by a chemical decontamination apparatus includes:

a circulation piping is connected to a piping system to be chemically decontaminated, which is a constituent member of a nuclear power plant, and supplies an aqueous solution containing a reduction decontamination agent to the piping system;

a corrosion potential measuring device which measures a corrosion potential of an aqueous solution connected to the circulation piping and discharged from a decomposition device to which the aqueous solution and the oxidizing agent are supplied in the circulation piping;

a concentration ratio calculation device which determines a concentration ratio of a $Fe^{3+}$ to a $Fe^{2+}$ of the aqueous solution based on a corrosion potential measured by a corrosion potential measuring device; and a control device which controls the supply amount of the oxidizing agent to the decomposition device based on the concentration ratio determined by the concentration ratio calculation device.

(A1) A chemical decontamination method includes the steps of:

bringing an aqueous solution of a reduction decontamination agent into contact with a surface of a constituent member of a nuclear power plant that is in contact with a reactor water; and performing a reduction decontamination of the constituent member, in the step of decomposing the reduction decontamination agent contained in the aqueous solution, to measure the corrosion potential of the aqueous solution discharged from the decomposition device to which the oxidizing agent is supplied, to determine $Fe^{3+}$ concentration of the aqueous solution relative to $Fe^{2+}$ based on the measured corrosive potential, to control an amount of an oxidizing agent supplied to the decomposition device based on the concentration ratio, in which the control of the supply amount of the oxidizing agent to the decomposition device based on the concentration ratio is determining the concentration of the oxidizing agent in the aqueous solution flowing into the decomposition device based on the concentration ratio, and controlling the supply amount of the oxidizing agent to the decomposition device based on the concentration of the oxidizing agent.

A more preferable configuration of the chemical decontamination method will be described below.

In addition, in the above configuration (A1), the description from "A chemical decontamination method includes the steps of: bringing an aqueous solution of a reduction decontamination agent into contact with a surface of a constituent member of a nuclear power plant that is in contact with a reactor water; and performing a reduction decontamination of the constituent member" to "to control an amount of an oxidizing agent supplied to the decomposition device based on the concentration ratio" corresponds to the configuration described in claim 1. Further, in the above configuration (A1), the description from "the control of the supply amount of the oxidizing agent to the decomposition device based on the concentration ratio" to "controlling the supply amount of the oxidizing agent to the decomposition device based on the concentration of the oxidizing agent." corresponds to the configuration described in claim 10.

(A2) Preferably, in the above configuration (A1), it is desirable to display the determined concentration ratio of $Fe^{3+}$ to $Fe^{2+}$.

(A3) Preferably, in the above configuration (A1) or (A2), it is desirable to irradiate the aqueous solution with ultraviolet rays before it is supplied to the decomposition device.

(A4) Preferably, in any of the above configurations (A1) to (A3), it is desirable that the reduction decontamination agent contained in the aqueous solution is decomposed by the ultraviolet rays irradiation to the aqueous solution, and the reduction decontamination agent is decomposed by the catalyst present in the decomposition device and the oxidizing agent supplied to the decomposition device.

(A5) Preferably, in any of the above configurations (A1) to (A4), it is desirable to determine whether the feed of the oxidizing agent to the decomposer is excessive based on the concentration of the oxidizing agent.

(A6) Preferably, in any one of the above configurations (A1) to (A4), it is desirable to determine that the feed rate of the oxidizing agent to the decomposition device is excessive when it is larger than the first concentration setting value of the oxidizing agent corresponding to the concentration ratio of 1.

(A7) Preferably, in the above configuration (A5) or (A6), it is desirable to reduce the supply amount of the oxidizing agent to the decomposition device when the supply amount of the oxidizing agent to the decomposition device is excessive.

(A8) Preferably, in the above configuration (A5) or (A6), it is desirable to increase the supply amount of the oxidizing agent to the decomposition device so that the concentration of the oxidizing agent becomes the second concentration ratio set value when it is determined that the supply amount of the oxidizing agent to the decomposition device is not excessive and it is determined that the concentration of the oxidizing agent is smaller than the second concentration set value which is equal to or smaller than the first concentration set value.

(A9) Preferably, in any of the above configurations (A1) to (A8), it is desirable that the aqueous solution discharged from the decomposition device is stirred upstream of the position at which the corrosive potential is measured.

(B1) A chemical decontamination method includes the steps of:

forming a closed loop including a first piping and a second piping by connecting the second piping different from the first piping to the first piping to be chemically decontaminated, the first piping being a constituent member of a nuclear power plant and being communicated to a reactor pressure vessel;

performing the reduction decontamination on the inner surface of the second piping by supplying an aqueous solution containing a reduction decontamination agent from the second piping to the first piping, in the step of decomposing the reduction decontamination agent contained in the aqueous solution, to measure a corrosion potential of the aqueous solution that is communicated to the second piping and returned from the first piping to the second piping, the aqueous solution being discharged from the decomposition device to which an oxidizing agent is supplied, to determine the concentration ratio $Fe^{3+}$ relative to $Fe^{2+}$ of the aqueous solution based on the measured corrosive potential.

to control the supply amount of the oxidizing agent to the decomposition device based on the concentration ratio.

A more preferable configuration of the chemical decontamination method will be described below.

(B2) Preferably, in the above configuration (B1), the control of the supply amount of the oxidizing agent is desirable to determine the concentration of the oxidizing agent in the aqueous solution flowing into the decomposition device based on the concentration ratio, and to control the supply amount of the oxidizing agent to the decomposition device based on the concentration of the oxidizing agent.

(B3) Preferably, in the above configuration (B2), it is desirable to irradiate the aqueous solution by the second piping with ultraviolet rays before being supplied to the decomposition device.

(B4) Preferably, in the above configuration (B3), it is desirable to decompose the reduction decontamination agent contained in the aqueous solution by the ultraviolet rays irradiation to the aqueous solution, and to decompose the reduction decontamination agent by the catalyst present in the decomposition device and the oxidizing agent supplied to the decomposition device.

(C1) A chemical decontamination apparatus includes:

a circulation piping which is connected to a piping system to be chemically decontaminated, the piping system being a constituent member of a nuclear power plant, and which supplies an aqueous solution containing a reduction decontamination agent to the piping system;

a corrosion potential measuring device which measures a corrosion potential of the aqueous solution which is connected to the circulation piping and is in the circulation piping, and the aqueous solution discharged from a decomposition device to which the oxidizing agent are supplied;

a concentration ratio calculation device which determines a concentration ratio of $Fe^{3+}$ to $Fe^{2+}$ of the aqueous solution based on the corrosion potential measured by the corrosion potential measuring device; and a control device which controls the supply amount of the oxidizing agent to the decomposition device based on the concentration ratio determined by the concentration ratio calculation device.

A more preferable configuration of the chemical decontamination apparatus will be described below.

(C2) Preferably, in the above configuration (C1), the control device which controls the supply amount of the oxidizing agent to the decomposition device based on the concentration ratio is desirable to be a control device which determines the concentration of the oxidizing agent of the aqueous solution flowing into the decomposition device based on the concentration ratio, and which controls the supply amount of the oxidizing agent to the decomposition device based on the determined concentration of the oxidizing agent.

(C3) Preferably, in the above configuration (C2), it is desirable to provide an ultraviolet rays irradiation device that irradiates the aqueous solution supplied to the decomposition device with ultraviolet rays.

(C4) Preferably, in the above configuration (C3), it is desirable to provide a mixing device that stirs the aqueous solution discharged from the decomposition device upstream of a position where the corrosive potential measuring device is disposed.

Advantageous Effects of Invention

According to the present invention, it is possible to shorten the time required for decomposition of the reduction decontamination agent.

DESCRIPTION OF EMBODIMENTS

Figure 1:
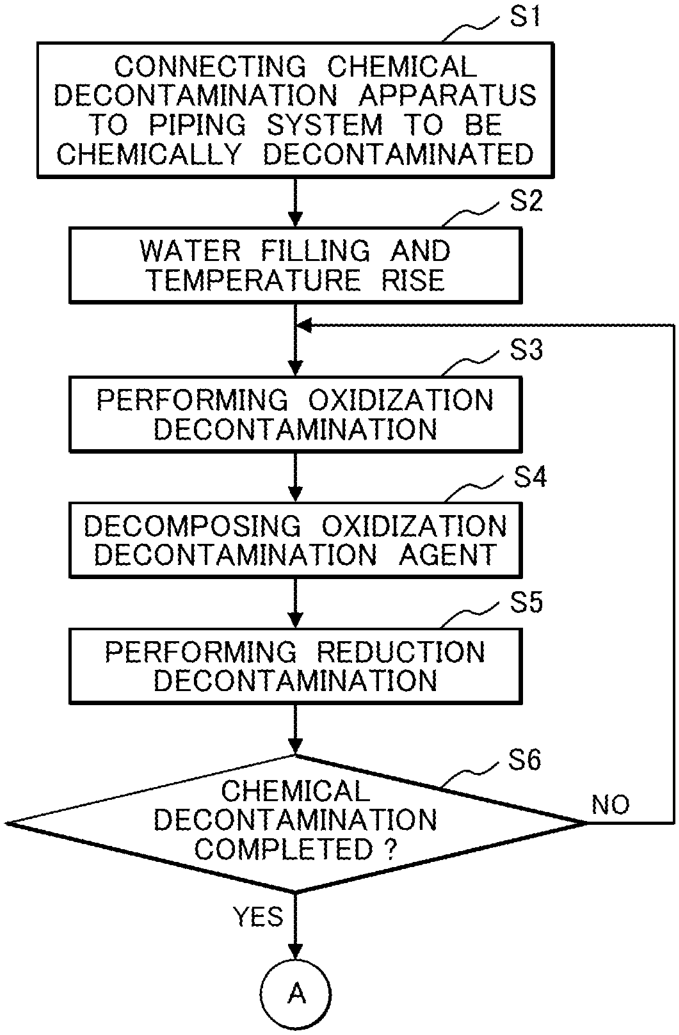
FIG. 1 is a flow chart showing the steps S1 to S9 of processes in a chemical decontamination method according to First Embodiment applied to a boiling water nuclear power plant, which is a preferred embodiment of the present invention.

The present inventors conducted various studies on a chemical decontamination method applied to a nuclear power plant, which can shorten a time required for a decomposition step of a reduction decontamination agent in a chemical decontamination method applied to a nuclear power plant.

In these studies, the present inventors considered whether there is a method capable of measuring the hydrogen peroxide concentration of an oxalic acid aqueous solution flowing out from the decomposition device without performing sampling and analysis of the oxalic acid aqueous solution, which is a factor that increases the time of the decomposition step of the reduction decontamination agent. As a result, the present inventors decided to irradiate the oxalic acid aqueous solution supplied to the decomposition device including a catalyst with ultraviolet rays.

By reduction decontamination using the oxalic acid aqueous solution on a surface of chemical decontamination objects of the nuclear power plant, an oxide film containing iron and a radionuclide is dissolved, the oxide film being formed on the surface of the chemical decontamination objects (constituent members of the nuclear power plant), and $Fe^{3+}$ and ions of the radionuclide are eluted into the oxalic acid aqueous solution. As described above, when the oxalic acid aqueous solution containing oxalic acid ($(COOH)_2$) and $Fe^{3+}$ is irradiated with ultraviolet rays, a reaction represented by the following formula (1) occurs, and $Fe^{3+}$ changes to $Fe^{2+}$.

$$Fe^{3+}+(COOH)_2 \rightarrow Fe^{2+}CO_2+H_2O \text{ (ultraviolet rays irradiation environment)} \quad (1)$$

When the oxalic acid aqueous solution containing $Fe^{2+}$ generated in the reaction of the formula (1) is supplied to the decomposition device and hydrogen peroxide is supplied to the decomposition device, $Fe^{2+}$ and hydrogen peroxide are reacted in the decomposition device (see the following formula (2)) to produce $Fe^{3+}$ and OH*.

$$Fe^{2+}+H_2O_2 \rightarrow Fe^{3+}+OH^{*}+OH^{-} \quad (2)$$

When OH* and oxalic acid react, the oxalic acid is decomposed into water ($H_2O$) and carbon dioxide ($CO_2$) as shown in the following formula (3).

$$OH^{+}(COOH)_2 \rightarrow H_2O+CO_2 \quad (3)$$

$Fe^{3+}$ generated in the reaction represented by the formula (2) also contributes to the reaction represented by the formula (1) and promotes the reaction represented by the formula (1).

When hydrogen peroxide used in the reaction of the formula (2) is excessively injected into the oxalic acid aqueous solution, the injected hydrogen peroxide is not completely consumed in the decomposition of the oxalic acid, and flows into the cation exchange resin column to deteriorate the cation exchange resin in the cation exchange resin column. Therefore, hydrogen peroxide cannot be excessively injected into the oxalic acid aqueous solution.

Therefore, the present inventors conducted studies whether there is a method that can adjust the hydrogen peroxide supply amount to the decomposition device so that hydrogen peroxide does not flow out from the decomposition device without determining the hydrogen peroxide concentration of the oxalic acid aqueous solution discharged from the decomposition device by periodically sampling the oxalic acid aqueous solution discharged from the decomposition device on the downstream side of the decomposition device, and analyzing the sampled oxalic acid aqueous solution.

Consequently, the present inventors focused on $Fe^{3+}$ contained in the oxalic acid aqueous solution discharged from the decomposition device. $Fe^{3+}$ is produced by reacting $Fe^{2+}$ contained in the oxalic acid aqueous solution with the hydrogen peroxide supplied to the oxalic acid aqueous solution, as shown in the formula (2). As the amount of hydrogen peroxide supplied to the oxalic acid aqueous solution increases, the amount of $Fe^{3+}$ produced increases, and the concentration of $Fe^{3+}$ contained in the oxalic acid aqueous solution discharged from the decomposition device increases. In order to suppress the influence of the change in the concentration of $Fe^{2+}$ contained in the oxalic acid aqueous solution, the present inventors decided to represent the concentration of $Fe^{3+}$ contained in the oxalic acid aqueous solution discharged from the decomposition device by a concentration ratio ($Fe^{3+}/Fe^{2+}$) of $Fe^{3+}$ contained in the oxalic acid aqueous solution to $Fe^{2+}$ contained in the oxalic acid aqueous solution.

By using this concentration ratio, the reduction decontamination aqueous solution (e.g., oxalic acid aqueous solution) and $Fe^{3+}/Fe^{2+}$ can be formulated by Nernst's law represented by the following formula (4). Accordingly, the present inventors have newly found a process of measuring the corrosion potential of the oxalic acid aqueous solution discharged from the decomposition device and controlling the feed rate of an oxidizing agent (e.g., hydrogen peroxide) to the decomposition device based on the concentration ratio $Fe^{3+}/Fe^{2+}$ obtained by substituting the corrosion potential obtained by the measurement into E in the formula (4).

$$E=(RT/nF)\times\log([Fe^{3+}]/[Fe^{2+}]) \quad (4)$$

Here, E is a corrosion potential of a reduction decontamination aqueous solution (an oxalic acid aqueous solution), R is the gas constant, T is a temperature of the reduction decontamination aqueous solution, n is the valence number, and F is the Faraday constant.

Figure 5:
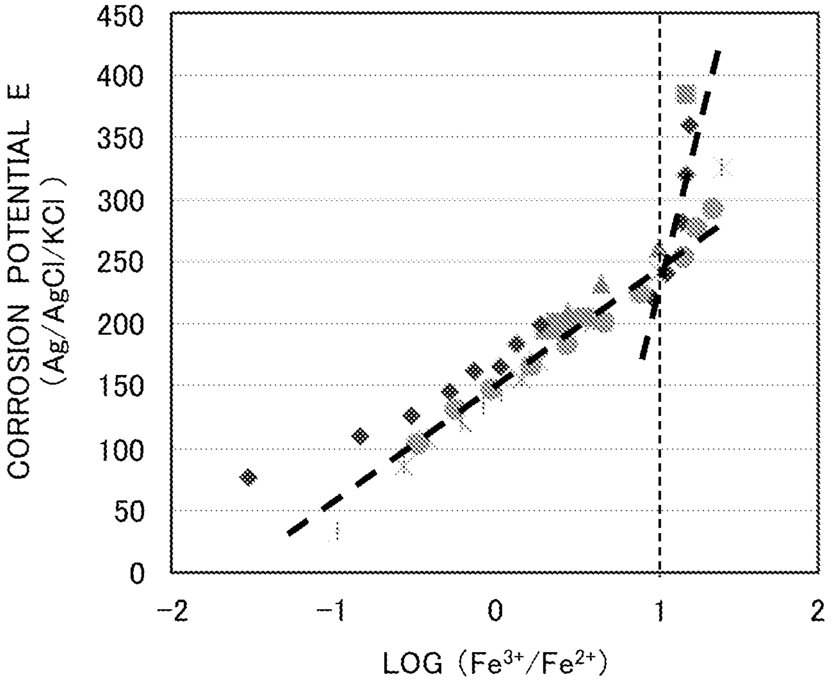
FIG. 5 is a characteristic diagram showing the relation between a corrosion potential of a reduction decontamination solution and the ratio of the concentration of $Fe^{3+}$ to the concentration of $Fe^{2+}$ in the reduction decontamination solution.

In order to examine the relation between each of the reactions of the formulas (1) to (3) and the corrosion potential, the relation between the concentration ratio of $Fe^{3+}$ to $Fe^{2+}$ and the corrosion potential was experimentally determined. These relationships are shown in FIG. 5. As is clear from FIG. 5, when the concentration ratio of $Fe^{3+}$ to $Fe^{2+}$ exceeds 1, the slope of the straight line representing the relation between the concentration ratio of $Fe^{3+}$ to $Fe^{2+}$ and the corrosive potential becomes steep. That is, it is possible to determine the concentration ratio of $Fe^{3+}$ to $Fe^{2+}$ by using the corrosion potential of the oxalic acid aqueous solution (reduction decontamination aqueous solution), and it is possible to determine from the relation between the concentration ratio and the corrosion potential whether the amount of hydrogen peroxide (oxidizing agent) injected into the oxalic acid aqueous solution represented by the formula (2) is excessive or insufficient.

Specifically, the corrosion potential of the oxalic acid aqueous solution injected with hydrogen peroxide is measured by using a corrosion potentiometer, and the concentration ratio of $Fe^{3+}$ to $Fe^{2+}$ is obtained from the relation between the concentration ratio of $Fe^{3+}$ to $Fe^{2+}$ and the corrosion potential shown in FIG. 5 based on the measured corrosion potential. When the determined concentration ratio is greater than "1", the amount of the hydrogen peroxide is too much. In this case, the hydrogen peroxide injected into the oxalic acid aqueous solution is reduced such that the concentration ratio is, for example, "1". When the concentration ratio is less than "1", there is a shortage of hydrogen peroxide and the injection of hydrogen peroxide into the oxalic acid aqueous solution is carried out. In this case, the injection amount of hydrogen peroxide into the oxalic acid aqueous solution is increased such that the concentration ratio is, for example, "1". When the concentration ratio is "1", the injection amount of hydrogen peroxide into the oxalic acid aqueous solution is maintained as it is.

When the concentration ratio of $Fe^{3+}$ to $Fe^{2+}$ is set to "1", hydrogen peroxide may be injected into the oxalic acid aqueous solution so as to approach the set value "1" when the concentration ratio is smaller than "1". When the concentration ratio is "1" which is the same as the set value, the injected hydrogen peroxide does not flow out of the decomposition device, and the decomposition efficiency of oxalic acid contained in the oxalic acid aqueous solution is maximized. Therefore, the concentration ratio should be close to "1".

When the set value of the concentration ratio of $Fe^{3+}$ to $Fe^{2+}$ is set to a certain preferable range, for example, a value within a range of 0.8 or more and 1.0 or less, the injection amount of hydrogen peroxide into the oxalic acid aqueous solution may be controlled so as to be a set value within a preferable range of 0.8 or more and 1.0 or less. When the concentration ratio of $Fe^{3+}$ to $Fe^{2+}$ is smaller than "1", the injection amount of hydrogen peroxide into the oxalic acid aqueous solution may be controlled so that the concentration ratio becomes a set point within a certain range, for example, within a range of 0.8 or more and 1.0 or less.

Instead of substituting E in the formula (4) for the corrosion potential of the oxalic acid aqueous solution discharged from the decomposition device obtained by the measurement, the concentration ratio ($Fe^{3+}/Fe^{2+}$) of $Fe^{3+}$ contained in the oxalic acid aqueous solution to $Fe^{2+}$ corresponding to the measured corrosion potential may be determined based on the characteristic diagram of FIG. 5, and the feed rate of the oxidizing agent (e.g., hydrogen peroxide) to the decomposition device may be controlled based on the concentration ratio $Fe^{3+}/Fe^{2+}$.

Further, the concentration ratio $Fe^{3*}/Fe^{2+}$ can be obtained by substituting the corrosive potential measured at the downstream side of the decomposition device into E in the formula (4), and the concentration of the oxidizing agent (for example, hydrogen peroxide) of the reduction decontamination aqueous solution flowing into the decomposition device can be obtained based on the obtained concentration ratio $Fe^{3+}/Fe^{2+}$. Therefore, the amount of the oxidizing agent supplied to the decomposition device can be controlled based on the determined concentration of the oxidizing agent.

The concentration of the oxidizing agent in the reduction decontamination aqueous solution flowing into the decomposition device can also be determined based on the concentration ratio $Fe^{3+}/Fe^{2+}$ obtained by determining the concentration ratio $Fe^{3+}/Fe^{2+}$ corresponding to the measured corrosive potential using the characteristic diagram of FIG. 5. The supply amount of the oxidizing agent to the decomposition device may be controlled based on the concentration of the oxidizing agent in the reduction decontamination aqueous solution flowing into the decomposition device thus determined.

Based on the above investigation results, the present inventors were able to discover new knowledge that the amount of the oxidizing agent supplied to the decomposition device can be controlled by carrying out any of the following controls without sampling and analyzing the aqueous solution of the reduction decontamination agent. (a) one is to measure the corrosion potential of the aqueous solution of the reduction decontamination agent discharged from a decomposition device to which the oxidizing agent is supplied, and determine the concentration ratio of $Fe^{3+}$ to $Fe^{2+}$ of the aqueous solution based on the measured corrosion potential. And (b) the other is to determine the concentration ratio of $Fe^{3+}$ to $Fe^{2+}$ of the aqueous solution based on the measured corrosion potential, determine the concentration of the oxidizing agent of the aqueous solution flowing into the decomposition device based on the concentration ratio, and control the amount of the oxidizing agent supplied to the decomposition device based on the concentration of the oxidizing agent.

Embodiments of the present invention reflecting this new knowledge are described below. Each of First Embodiment to Fourth Embodiment is an example in which the amount of the oxidizing agent supplied to the decomposition device is controlled by the method (a), and Fifth Embodiment is an example in which the amount of the oxidizing agent supplied to the decomposition device is controlled by the method (b).

First Embodiment

A chemical decontamination method of First Embodiment which is a preferred embodiment of the present invention will be described with reference to FIGS. 1, 2, 3 and 4. The chemical decontamination method of the present embodiment is applied to a recirculation system piping of a boiling water nuclear power plant (BWR plant).

A schematic configuration of the BWR plant will be described with reference to FIG. 3. BWR plant 1 includes a reactor 2, a turbine 9, a condenser 10, a recirculation system, a reactor cleanup system, a feed water system, etc. The reactor 2 is a steam generator, has a reactor pressure vessel 3 (hereinafter referred to as RPV) containing a core 4, and has a plurality of jet pumps 5 disposed in an annular downcomer formed between an outer surface of a core shroud (not shown) surrounding the core 4 in the RPV 3 and an inner surface of the RPV 3. The core 4 is loaded with a number of fuel assemblies (not shown). The fuel assembly includes a plurality of fuel rods filled with a plurality of fuel pellets made of a nuclear fuel material.

The recirculation system includes a recirculation system piping 6 made of stainless steel and a recirculation pump 7 disposed in the recirculation system piping 6. The water supply system is configured by installing a condensate pump 12, a condensate purifying device 13 (for example, a condensate demineralizer), a low pressure feed water heater 14A, a feed water pump 15, and a high pressure feed water heater 14B in this order from the condenser 10 toward the RPV 3 in a water supply piping 11 that connects the condenser 10 to the RPV 3. In the reactor cleanup system, a cleanup system pump 19, a regenerative heat exchanger 20, a non-regenerative heat exchanger 21, and a reactor water cleanup device 22 are disposed in this order in a cleanup system piping 18 that connects a recirculation system piping 6 and a water supply piping 11. The cleanup system piping 18 is connected to the recirculation system piping 6 upstream of the recirculation pump 7. The reactor 2 is disposed in a reactor containment vessel 24 disposed in a reactor building (not shown).

A cooling water in the RPV 3 (hereinafter referred to as reactor water) is pressurized by the recirculation pump 7 and injected into the jet pump 5 through the recirculation system piping 6. The reactor water present in the downcomer around the nozzle of the jet pump 5 is also sucked into the jet pump 5 and supplied to the core 4 together with the aforementioned reactor water injected into the jet pump 5. The reactor water supplied to the core 4 is heated by heat generated in nuclear fission of the nuclear fuel material in the fuel rods in the fuel assembly, and a portion of the reactor water becomes steam. The steam is removed by a steam separator (not shown) and a steam dryer (not shown) disposed in the RPV 3, and is then led to the turbine 9 through the main steam piping 8 to rotate the turbine 9. A generator (not shown) connected to the turbine 9 rotates to generate electric power.

The steam discharged from the turbine 9 is condensed in the condenser 10 to become water. This water is supplied into the RPV 3 through a water supply piping 11 as a water supply. The feed water flowing through the feed water piping 11 is pressurized by the condensate pump 12, the impurities are removed by the condensate purification device 13, and further pressurized by the feed water pump 15. The feed water is heated by the extraction steam extracted from the turbine 9 by the extraction piping 16 at the low pressure feed water heater 14A and the high pressure feed water heater 14B, and is led into the RPV 3. The drain water recovery piping 17 is connected to the condenser 10 by being connected to the high pressure feed water heater 14B and the low pressure feed water heater 14A.

A portion of the reactor water flowing in the recirculation system piping 6 flows into the cleanup system piping 18 by driving of the cleanup system pump 19, is cooled by the regenerative heat exchanger 20 and the non-regenerative heat exchanger 21, and is purified by the reactor water cleanup device 22. The purified reactor water is heated by the regenerative heat exchanger 20 and returned to the RPV 3 via the cleanup system piping 18 and the water supply piping 11.

Figure 3:
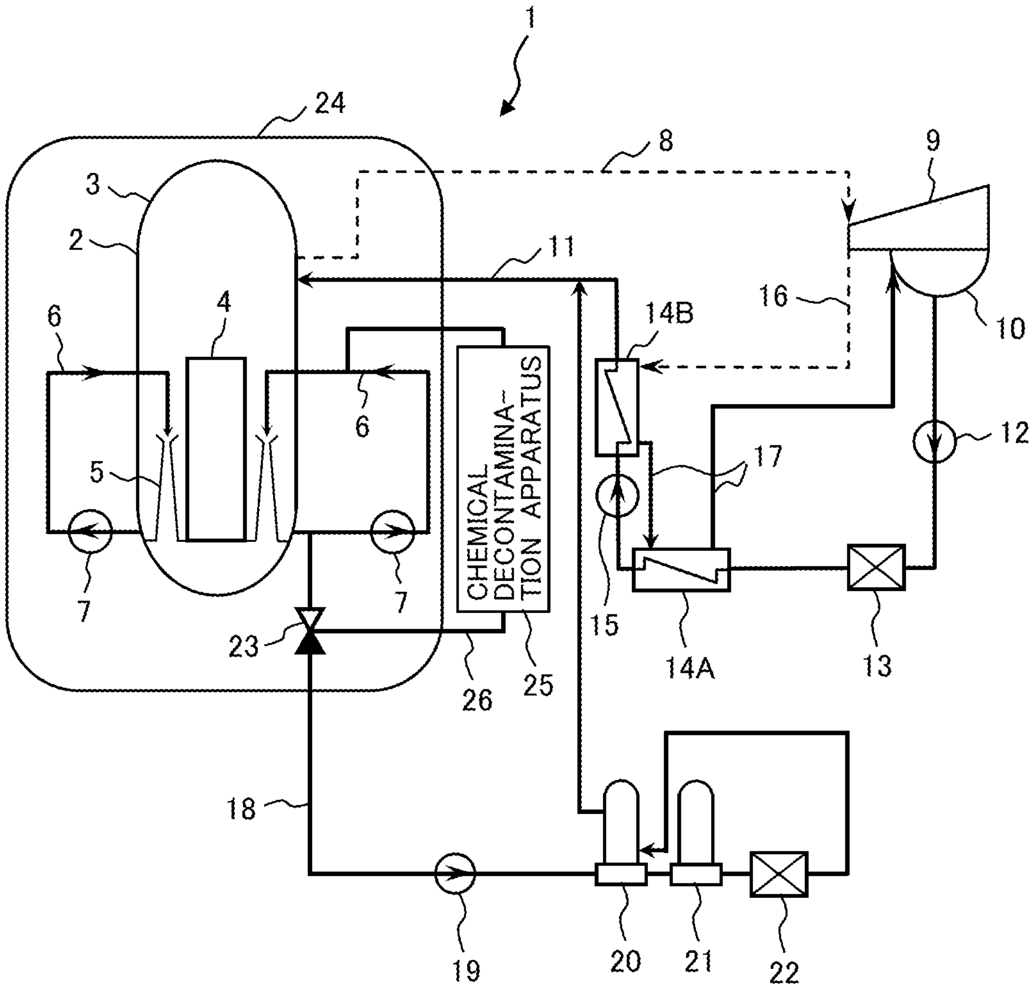
FIG. 3 is an explanatory diagram showing a state in which the chemical decontamination apparatus used to perform the chemical decontamination method of the First Embodiment shown in FIGS. 1 and 2 is connected to a recirculation system piping of the boiling water nuclear power plant.

In the chemical decontamination method of the present embodiment, a chemical decontamination apparatus 25 is used, and the chemical decontamination apparatus 25 is connected to the recirculation system piping 6 as shown in FIG. 3.

A detailed configuration of the chemical decontamination apparatus 25 will be described with reference to FIG. 4.

The chemical decontamination apparatus 25 includes a circulation piping 26, circulation pumps 27 and 44, a heater 28, a cation exchange resin column 29, a mixed bed resin column 30, a surge tank 33, a pH adjuster injection device 34, a cooler 48, an ultraviolet rays irradiation device 31, a decomposition device 32, an oxidizing agent supply device 39, a corrosion potential meter 45, an ejector 46, a concentration ratio calculation device 79, and a control device 80.

An on-off valve 52, the circulation pump 27, valves 53, 54, 55 and 56, the surge tank 33, the circulation pump 44, a valve 57, and an on-off valve 58 are provided in the circulation piping 26 in this order from the upstream. A piping 60 bypassing the valve 53 is connected to the circulation piping 26, and the valve 59 and the filter 47 are disposed on the piping 60. A cooler 48 and a valve 61 are disposed on a piping 62 that is connected to the circulation piping 26 at both ends thereof by bypassing the heater 28 and the valve 54. The cation exchange resin column 29 and the valve 63 are disposed on the piping 64 which is connected at both ends to the circulation piping 26 and bypasses the valve 55. Both ends are connected to the piping 64, and a mixed bed resin column 30 and a valve 65 are disposed on a piping 66 that bypasses the cation exchange resin column 29 and the valve 63. The cation exchange resin column 29 is filled with a cation exchange resin, and the mixed bed resin column 30 is filled with a cation exchange resin and an anion exchange resin.

A decomposition device 32 is disposed on a piping 67 that bypasses the valve 56 and is connected at both ends to the circulation piping 26. The decomposition device 32 is filled with, for example, an activated carbon catalyst in which ruthenium adheres to the surface of the activated carbon. A valve 68 and a corrosion potential meter 45 are provided downstream of the decomposition device 32 of the piping 67. The corrosion potential meter 45 is located downstream of valve 68. The ultraviolet rays irradiation device 31 is disposed in the circulation piping 26 between a connection point of the circulation piping 26 and the piping 64 and a connection point of the piping 67 with the circulation piping 26 at an upstream end of the decomposition device 32.

A surge tank 33 is disposed in the circulation piping 26 between the valve 56 and the circulation pump 44. A piping 69 provided with the valve 70 and the ejector 46 is connected to the circulation piping 26 between the valve 57 and the circulation pump 44, and is further connected to the surge tank 33. A hopper (not shown) is provided in the ejector 46 for separately supplying an oxidization decontamination agent, e.g., permanganic acid and the reduction decontamination agent, e.g., oxalic acid, into the piping 69. As the reduction decontamination agent, at least one of oxalic acid, malonic acid, formic acid, and ascorbic acid is used.

The pH adjuster injection device 34 includes a chemical solution tank 35, an injection pump 36, and an injection piping 37. The chemical solution tank 35 is connected to the circulation piping 26 by the injection piping 37 provided with an injection pump 36 and a valve 38. The injection piping 37 is connected to the circulation piping 26 between the valve 57 and the on-off valve 58. An aqueous solution of hydrazine which is a pH adjuster is filled into the chemical solution tank 35.

The oxidizing agent supply device 39 includes a chemical solution tank 40, a supply pump 41, and a supply piping 42. The chemical solution tank 40 is connected to a piping 67 upstream of the decomposition device 32 by a supply piping 42 provided with a supply pump 41 and a valve 43. Hydrogen peroxide which is an oxidizing agent is filled into the chemical solution tank 40. This hydrogen peroxide is used as a chemical substance used in the decomposition of oxalic acid and a pH adjuster (e.g., hydrazine) in the decomposition device 32. As the oxidizing agent, water in which ozone or oxygen is dissolved may be used in addition to hydrogen peroxide.

A pH meter 50 is attached to the circulation piping 26 between the connecting point of the piping 60 and the circulation piping 26 and the valve 53. A pH meter 51 is attached to the circulation piping 26 between the connecting point of the injection piping 37 and the circulation piping 26 and the on-off valve 58. Furthermore, a conductivity meter 49 is attached to the circulation piping 26 between the connection point of the injection piping 37 and the circulation piping 26 and the valve 57.

The BWR plant 1 is stopped after an operation in one operation cycle is completed. After this shutdown, a part of the fuel assembly loaded in the core 4 is taken out as a spent fuel assembly, and a new fuel assembly having a burnup 0 GWd/t is loaded into the core 4. After such fuel change is completed, the BWR plant 1 is restarted for an operation in a subsequent operating cycle. Maintenance and inspection of the BWR plant 1 are carried out using the duration during which the BWR plant 1 is stopped for the fuel change.

While the operation of the BWR plant 1 is stopped as described above, the chemical decontamination method of the present embodiment is carried out for a stainless steel piping system, e.g., the recirculation piping 6, which is one of the stainless steel members in the BWR plant 1 and which is communicated to the RPV 3. In this chemical method, oxidation decontamination and reduction decontamination are performed on the recirculation system piping 6 in which an oxide film containing iron oxide, chromium oxide, and radionuclide is formed on the inner surface.

Figure 2:
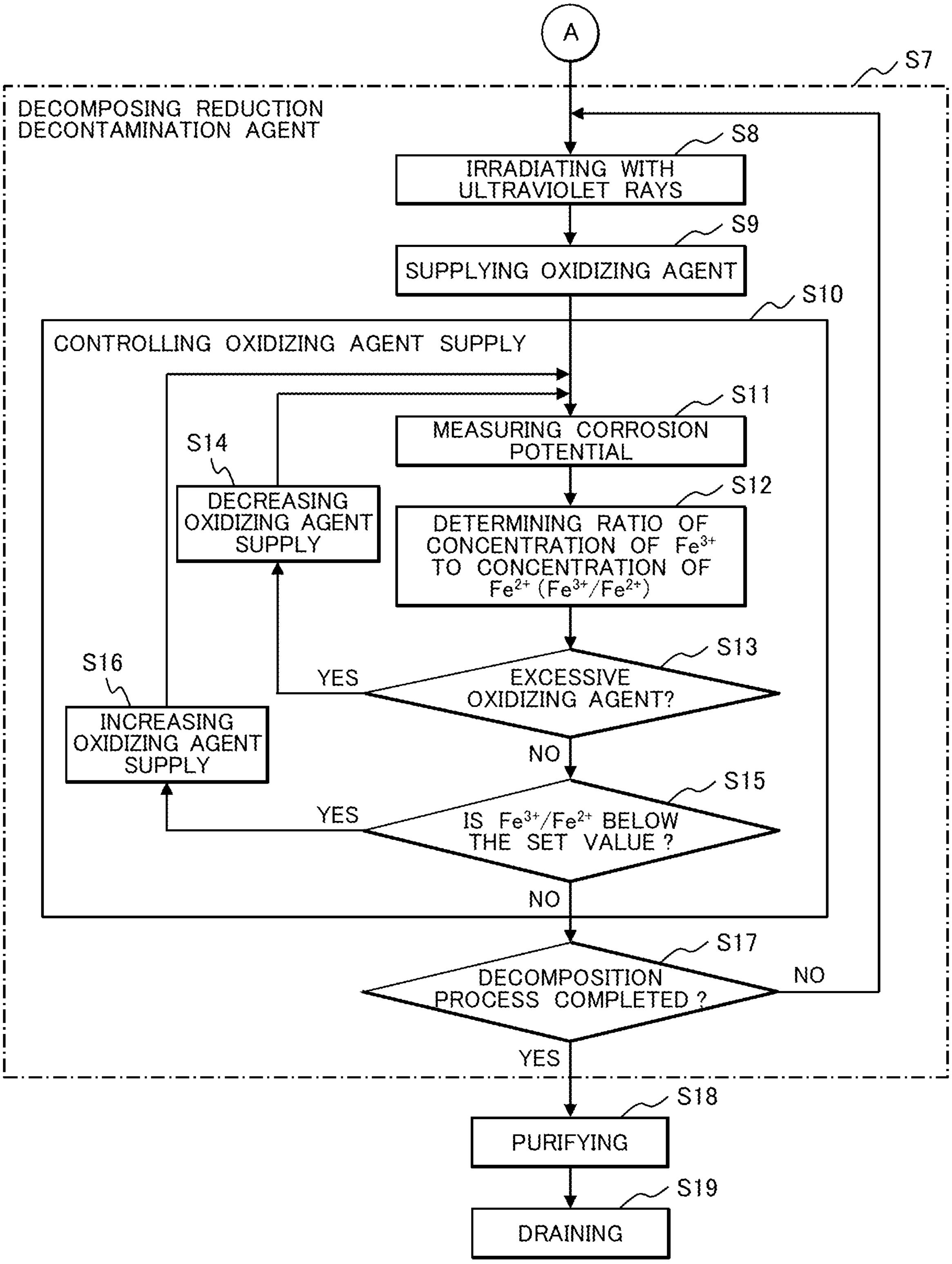
FIG. 2 is a flow chart showing the steps S7 to S19 of processes in the chemical decontamination method according to the First Embodiment applied to the boiling water nuclear power plant, which is a preferred embodiment of the present invention.

The chemical decontamination method of the present embodiment, which is directed to the recirculation system piping 6 in the BWR plant 1, will be described below based on the sequence shown in FIGS. 1 and 2. In the chemical decontamination method of the present embodiment, the chemical decontamination apparatus 25 is used, and the steps of the method S1 to S19 shown in FIGS. 1 and 2 are performed. First, a chemical decontamination apparatus is connected to a piping system in which a chemical decontamination method is performed (step S1). Within the shutdown period of the BWR plant 1 after the operation of the BWR plant 1 is stopped, both ends of the circulation piping 26 of the chemical decontamination apparatus 25 which is a temporary facility are connected to a recirculation system piping 6 formed of a stainless steel. The recirculation system piping 6 is a component of the BWR plant. The operation of connecting the circulation piping 26 to the recirculation system piping 6 will be described in detail. After the operation of the BWR plant 1 is stopped, for example, a bonnet of a valve 23 disposed in the cleanup system piping 18 connected to the recirculation system piping 6 is opened to seal the cleanup system pump 19 side of the bonnet. One end of the circulation piping 26 of the chemical decontamination apparatus 25, that is, the on-off valve 58 of the circulation piping 26 connects the open end to the flange of the valve 23. Thus, one end of the circulation piping 26 is connected to the recirculation system piping 6 upstream of the recirculation pump 7. Further, a branch piping such as a drain piping or an instrumentation piping connected to the recirculation system piping 6 on the downstream side of the recirculation pump 7 is disconnected, and the other end of the circulation piping 26, that is, the on-off valve 52 of the circulation piping 26 connects the open end to the disconnected branch piping.

In this way, a closed loop including the recirculation system piping 6 and the circulation piping 26 is formed by connecting both ends of the circulation piping 26 to the recirculation system piping 6. The respective openings of the RPV 3 at both ends of the recirculation system piping 6 are sealed with plugs (not shown) so that the chemical decontamination solution does not flow into the RPV 12.

Water is filled in a piping system and a chemical decontamination apparatus of a chemical decontamination object, and the water is heated after being filled with water (step S2). Water is filled in the recirculation system piping 6 and the circulation piping 26 of the chemical decontamination apparatus 25. This water filling is performed using, for example, a reactor auxiliary cooling water system (not shown). The on-off valve 52, the valves 53, 54, 55, 56 and 57, and the on-off valve 58 are opened, respectively, and in a state in which the other valves are closed, cooling water is supplied from the reactor auxiliary cooling water system into the circulation piping 26 and the recirculation piping 6, and the inside of these piping is filled with water. Then, the circulation pumps 27 and 44 are driven, and the water is circulated in a closed loop including the circulation piping 26 and the recirculation system piping 6. The water circulating in this closed loop is heated to 90° C. by the heater 28.

An oxidization decontamination is performed (step S3). In the BWR plant 1 which has experienced the operation, an oxide film containing iron oxide, chromium oxide, and radionuclide is formed on the inner surface of the recirculation system piping 6 contacting the reactor water in the RPV 3. A chemical decontamination is performed to dissolve the oxide film. This chemical decontamination includes the oxidization decontamination and the reduction decontamination.

First, the oxidation decontamination will be described. When the temperature of the water circulating in the above-described closed loop reaches 90° C., the valve 70 is opened, and a part of the water in the circulation piping 26 which has been pressurized by the circulation pump 44 is led into the surge tank 33 through the piping 69. Potassium permanganate introduced into the hopper is supplied to the water flowing through the piping 69 by the ejector 46. Potassium permanganate is led into the surge tank 33 and dissolved by water in the surge tank 33. The dissolution of potassium permanganate produces an aqueous solution of potassium permanganate which is an oxidization decontamination aqueous solution in the surge tank 33. The generated potassium permanganate aqueous solution flows out from the surge tank 33 to the circulation piping 26, and is supplied from the circulation piping 26 to the recirculation system piping 6 through the valve 23. After a predetermined amount of potassium permanganate is supplied from the ejector 46 into the piping 69, the supply of potassium permanganate from the ejector 46 is stopped. Then, after the total amount of the supplied potassium permanganate is dissolved in the surge tank 33, the valve 70 is closed.

The potassium permanganate aqueous solution is brought into contact with an oxide film containing iron oxide, chromium oxide and radionuclide formed on the inner surface of the recirculation system piping 6 in the recirculation system piping 6, and oxidization decontamination is performed. By this oxidization decontamination, the chromium oxide contained in the oxide film is eluted into the aqueous solution of potassium permanganate. The pH meter 50 measures pH of the permanganate aqueous solution returned from the recirculation system piping 6 to the circulation piping 26. The pH meter 50 is used to monitor pH of the permanganate aqueous solution returned from the recirculation system piping 6 to the circulation piping 26. The potassium permanganate aqueous solution circulates in the closed loop including the circulation piping 26 and the recirculation piping 6, and oxidization decontamination of the recirculation piping 6 is performed. When the oxidation decontamination time for the recirculation system piping 6 has elapsed for a predetermined time, the oxidation decontamination is terminated.

The oxidization decontamination agent contained in the oxidization decontamination solution is decomposed (step S4). The aqueous solution of potassium permanganate flowing through the circulation piping 26 is supplied into the surge tank 33 through the piping 69 by opening the valve 70. In this state, oxalic acid which is a decomposition agent charged to the hopper is supplied to the potassium permanganate aqueous solution flowing in the piping 69 by the ejector 46. The amount of oxalic acid required to decompose the potassium permanganate contained in the aqueous solution of potassium permanganate present in the closed loop is supplied from the ejector 46 to the piping 69. The supplied oxalic acid is led to the surge tank 33 through the piping 69 and dissolved in the surge tank 33. The amount of oxalic acid is supplied while the potassium permanganate aqueous solution is flowed into the piping 69 so that the oxalic acid is uniformly mixed with the potassium permanganate aqueous solution present in the closed loop.

The dissolved oxalic acid decomposes the permanganic acid contained in the potassium permanganate aqueous solution. It is confirmed that the aqueous solution of potassium permanganate returned from the recirculation system piping 6 to the circulation line 26 becomes colorless and transparent from purple, and the decomposition process of the oxidization decontamination agent is finished. After the decomposition step of the oxidization decontamination agent is completed, an oxalic acid aqueous solution having a low concentration of oxalic acid circulates in the above-described closed loop.

The reduction decontamination is performed (step S5). After the decomposition of the potassium permanganate contained in the potassium permanganate aqueous solution is completed, the valve 70 is opened, whereby the oxalic acid aqueous solution having a low concentration of the oxalic acid flowing in the circulation piping 26 is led to the surge tank 33 through the piping 69. Again, the oxalic acid (reduction decontamination agent) input to the hopper is supplied to the oxalic acid aqueous solution flowing in the piping 69 by the ejector 46, and is led to the surge tank 33. In the surge tank 33, the supplied oxalic acid is dissolved in an oxalic acid aqueous solution, and an oxalic acid aqueous solution (a reduction decontamination solution) containing a predetermined concentration of oxalic acid used for reduction decontamination is generated.

In order to adjust the pH of the generated oxalic acid aqueous solution, an aqueous solution of hydrazine which is a pH adjusting agent in the chemical solution tank 35 of the pH adjuster injection device 34 is injected into the oxalic acid aqueous solution in the circulation piping 26 through the injection piping 37 by opening the valve 38 and driving the injection pump 36. The pH of the oxalic acid aqueous solution flowing in the circulation piping 26 is measured by a pH meter 51. The rotational speed of the injection pump 36 (or the opening degree of the valve 38) is controlled based on the measured pH, and the injection amount of the hydrazine aqueous solution into the circulation piping 26 is adjusted. The pH of the oxalic acid aqueous solution is adjusted to 2.5 by adjusting the injection volume of the hydrazine aqueous solution.

The oxalic acid aqueous solution containing hydrazine having the pH of 2.5 and 90° C. is supplied from the circulation piping 26 to the recirculation system piping 6, and is formed on the inner surface of the recirculation system piping 6 to be contacted with the surface of the oxide film in which the chromium oxide is eluted by the oxidation decontamination. The reduction decontamination of the inner surface of the recirculation system piping 6 is performed by oxalic acid contained in the oxalic acid aqueous solution, and the oxide film is dissolved. The iron and the radionuclide contained in the oxide film are eluted into the oxalic acid aqueous solution. The iron ion eluted in the oxalic acid aqueous solution is $Fe^{3+}$. Such reduction decontamination of the recirculation system piping 6 is performed while circulating the oxalic acid aqueous solution in the closed loop including the circulation piping 26 and the recirculation system piping 6. The pH meter 50 measures the pH of the oxalic acid aqueous solution returned to the circulation piping 26 in order to monitor the pH of the oxalic acid aqueous solution returned to the circulation piping 26 from the recirculation system piping 6.

Due to the dissolution of the oxide film formed on the inner surface of the recirculation system piping 6 due to the reduction decontamination, the radionuclide ion concentration and the iron ion concentration in the oxalic acid aqueous solution increase. Therefore, a portion of the oxalic acid aqueous solution containing the radionuclide ions and the iron ions is supplied to the cation exchange resin column 29 through the piping 64 by adjusting by opening the valve 63 and reducing the opening degree of the valve 55. The remaining oxalic acid aqueous solution is not supplied to the cation exchange resin column 29, and flows through the valve 55 and through the circulation piping 26. Metal cations such as radionuclide ions and iron ions contained in the oxalic acid aqueous solution led to the piping 64, that is, radionuclide ions and divalent iron ions are adsorbed and removed by the cation exchange resin in the cation exchange resin column 29. The oxalic acid aqueous solution discharged from the cation exchange resin column 29 and having a reduced concentration of the metal ions is returned to the circulation piping 26 downstream of the valve 55. The trivalent iron ions contained in the oxalic acid aqueous solution led to the piping 64 are present in the oxalic acid aqueous solution as the iron oxalate (III) complex which is a negative ion, and therefore are not adsorbed to the cation exchange resin in the cation exchange resin column 29.

The end of the chemical decontamination, in particular, the reduction decontamination is determined (step S6). In the piping system in which the reduction decontamination has been performed, specifically, when a surface dose rate of the recirculation system piping 6 has decreased to the set dose rate, the determination of step S6 of steps becomes "YES", and the reduction decontamination for the recirculation system piping 6 is ended. Incidentally, a state that the surface dose rate of the recirculation system piping 6 has decreased to the set dose rate is measured by a radiation detector. The radiation detector (not shown) is disposed in the vicinity of the recirculation system piping 6, for example. The radiation released from the recirculation system piping 6 is measured by the radiation detector. It is possible to confirm whether the surface dose rate of the recirculation system piping 6 has decreased to the set dose rate, based on the dose rate determined based on the output signal output from the radiation detector that has detected the radiation.

When the surface dose rate of the recirculation system piping 6 has not decreased to the set dose rate, the determination of the step S6 becomes "NO", and the steps S3 to S6 are repeated. When the determination of the step S6 becomes "YES", a decomposition step (step S7) of the reduction decontamination agent is performed.

In addition, the reduction decontamination step may be terminated when the elapsed time from the beginning of the reduction decontamination step (step S5) reaches a predetermined time, instead of the surface dose rate of the recirculation system piping 6. Further, the radiation released from the cation exchange resin column 29 for adsorbing the metal cation of the radionuclide is measured by the radiation detector. And the end of the reductive decontamination process may be determined based on the dose rate determined based on the output signal output from the radiation detector.

The step of decomposing the reduction decontamination agent (step S7) includes a step of irradiating ultraviolet rays (step S8), a step of supplying hydrogen peroxide (step S9), and a step of controlling the amount of supplying hydrogen peroxide (step S10). The details of the step of decomposing the reductive decontamination agent (step S7) will be described below.

The reduction decontamination aqueous solution is irradiated with the ultraviolet rays (S8 steps). The oxalic acid aqueous solution containing hydrazine (reduction decontamination aqueous solution) that has passed through the valve 55 and the oxalic acid aqueous solution containing hydrazine that has been discharged from the cation exchange resin column 29 merge at a connection point between the circulation piping 26 and the piping 64. The valve 68 is opened to adjust the opening degree of the valve 56 to decrease, and a portion of the merged oxalic acid aqueous solution is supplied to the decomposition device 32 through the piping 67. The oxalic acid aqueous solution discharged from the decomposition device 32 is returned to the circulation piping 26 downstream of the valve 56.

Between the connecting point of the circulation piping 26 and the piping 64 of the circulation piping 26 and the connecting point of the circulation piping 26 and the piping 67 upstream of the valve 56, the oxalic acid aqueous solution containing $Fe^{3+}$ flowing in the circulation piping 26 is irradiated with the ultraviolet rays by the ultraviolet rays irradiation device 31. As shown in the formula (1), $Fe^{3+}$ contained in the oxalic acid aqueous solution is converted into $Fe^{2+}$ by the ultraviolet rays irradiation, and a part of the oxalic acid contained in the oxalic acid aqueous solution is decomposed into carbon dioxide ($CO_2$) and water ($H_2O$).

The oxidizing agent is fed to the decomposer (step S9). When the oxalic acid and the hydrazine contained in the oxalic acid aqueous solution irradiated with the ultraviolet rays are decomposed, the valve 68 is opened to partially reduce the opening degree of the valve 56. An oxalic acid aqueous solution containing hydrazine is supplied to the decomposition device 32 through a piping 67. At this time, hydrogen peroxide which is an oxidizing agent in the chemical solution tank 40 is supplied to the decomposition device 32 through the supply piping 42 and the piping 67 by opening the valve 43 of the oxidizing agent supply device 39 and driving the supply pump 41.

The reaction of the above formula (2) occurs in the decomposition device 32 supplied with hydrogen peroxide. That is, $Fe^{2+}$ contained in the oxalic acid aqueous solution irradiated with the ultraviolet rays and supplied to the decomposition device 32 is converted into $Fe^{3+}$ by the action of hydrogen peroxide in the decomposition device 32, and $OH^*$ and $OH^-$ are further generated. Then, as shown in the above formula (3), oxalic acid and $OH^*$ react in the decomposition device 32, and oxalic acid is decomposed into water and carbon dioxide. The catalyst in the decomposition device 32 does not contribute to the reaction that generates $OH^*$ and $OH^-$.

The oxalic acid contained in the oxalic acid aqueous solution supplied to the decomposition device 32 is also decomposed by the action of the activated carbon catalyst and the supplied hydrogen peroxide in the decomposition device 32. This decomposition reaction is represented by the following formula (5). The hydrazine contained in the oxalic acid aqueous solution supplied to the decomposition system 32 is decomposed by the action of the activated carbon catalyst and the hydrogen peroxide in the decomposition device 32. This decomposition reaction is represented by the following formula (6).

$$(COOH)_2+H_2O_2 \rightarrow 2CO_2+2H_2O \quad (5)$$

$$N_2H_4+2H_2O_2 \rightarrow N_2+4H_2O \quad (6)$$

The decomposition of oxalic acid with the ultraviolet rays irradiation and the decomposition of oxalic acid and hydrazine in the decomposition device 32 are performed while the oxalic acid aqueous solution is circulated in a closed loop including the circulation piping 26 and the recirculation system piping 6.

The feed rate of the oxidizing agent is controlled (step S10). The supply amount control of the oxidizing agent includes each of these steps, that is, step S11 of measuring the corrosion potential, step S12 of determining the ratio ($Fe^{3+}/Fe^{2+}$) of the concentration of $Fe^{3+}$ to the concentration, step S13 of determining whether the oxidizing agent excesses, step S14 of reducing the feed amount of oxidizing agent, step S15 of determining whether $Fe^{3+}/Fe^{2+}$ is less than the set value, step S16 of increasing the feed amount of the oxidizing agent and step S17 of determining whether the decomposition process is completed, as shown in FIG. 2. Each of these steps will be described in detail below.

The corrosion potential is measured (step 11). The corrosion potential of the oxalic acid aqueous solution discharged from the decomposition device 32 is measured by the corrosion potential meter 45.

The ratio of the concentration of $Fe^{3+}$ to the concentration of $Fe^{2+}$ ($Fe^{3+}/Fe^{2+}$) is determined (step S12). The corrosion potential measured by the corrosion potential meter 45 is input to the concentration ratio calculation device 79. The concentration ratio calculation device 79 obtains the concentration ratio ($Fe^{3+}/Fe^{2+}$) corresponding to the inputted corrosive potential, based on the characteristic diagram of FIG. 5. The concentration ratio ($Fe^{3+}/Fe^{2+}$) is $Fe^{3+}$ contained in the oxalic acid aqueous solution with respect to $Fe^{2+}$, contained in the oxalic acid aqueous solution. The data of the characteristic diagram of FIG. 5 is stored in a storage device (not shown) of the concentration ratio calculation device 79. In addition, $Fe^{3+}/Fe^{2+}$ may be obtained by substituting the inputted corrosive potential into E in the formula (4) in the concentration ratio calculation device 79.

$Fe^{3+}/Fe^{2+}$ (concentration ratio) obtained by the concentration ratio calculation device 79 is inputted to the control device 80. The control device 80 adjusts the opening degree of the valve 43 based on $Fe^{3+}/Fe^{2+}$. The control device 80 may adjust the rotation speed of the supply pump 41 instead of the opening degree of the valve 43. A display device 82 is connected to the concentration ratio calculation device 79. $Fe^{3+}/Fe^{2+}$ (concentration ratio) obtained by the concentration ratio calculation device 79 is displayed on the displaying device 82.

It is determined whether the oxidizing agent is excessive (step S13). The control device 80 determines whether the quantity of hydrogen peroxide which is an oxidizing agent supplied to the decomposition device 32 is excessive based on $Fe^{3+}/Fe^{2+}$ obtained by the concentration ratio calculation device 79. As described above, when $Fe^{3+}/Fe^{2+}$ is greater than "1", the hydrogen peroxide is supplied to the decomposition device 32 excessively (see FIG. 5). When the value of $Fe^{3+}/Fe^{2+}$ inputted from the concentration ratio calculation device 79 to the control device 80 exceeds "1", for example, when the value is "1.3", the control device 80 determines "YES" in step S13.

In this process, the feed rate of the oxidizing agent to the decomposition device is reduced (step S14). The control device 80 stores "1" which is a setting value of $Fe^{3+}/Fe^{2+}$ in a storage device (not shown) of the control device 80. Since the determination of step S13 is "YES", the control device 80 reduces the opening degree of the valve 43 to reduce the quantity of hydrogen peroxide supplied from the chemical solution tank 40 to the decomposition device 32 so that the value of $Fe^{3+}/Fe^{2+}$ becomes "1" which is the set value. The steps S13 and S14 are repeated until the determination of step S13 is "NO". With such control, $Fe^{3+}/Fe^{2+}$ input from the concentration ratio calculation device 79 that inputs the output of the corrosion potential meter 45 to the control device 80 eventually becomes "1", and the outflow of hydrogen peroxide from the decomposition device 32 is eliminated. At this time, the control device 80 stops decreasing the opening degree of the valve 43. As a result, the reduction in the amount of hydrogen peroxide supplied to the decomposition device 32 is also stopped. Further, when $Fe^{3+}/Fe^{2+}$ outputted from the concentration ratio calculation device 79 is "1", the decomposition efficiency of oxalic acid in the decomposition device 32 to which hydrogen peroxide is supplied is the highest. Since the hydrogen peroxide does not flow out of the decomposition device 32, there is no inflow of the hydrogen peroxide into the cation exchange resin column 29, and deterioration of the cation exchange resin in the cation exchange resin column 29 due to hydrogen peroxide does not occur.

When the determination of the step S13 becomes "NO", the step S15 is performed.

It is determined whether $Fe^{3+}/Fe^{2+}$ is less than $Fe^{3+}/Fe^{2+}$ setting (step S15). When the determination of the step S13 is "NO" and the value of $Fe^{3+}/Fe^{2+}$ is a set value of "1" or less, for example, "1", in which the outflow of the oxidizing agent from the decomposition device 32 does not occur, the determination of the step S15 is "NO". When the determination of the step S15 is "NO", the determination of step S17 is performed.

If the determination of the step S15 which is "NO" continues and the determination of the step S15 becomes "YES", the step S16 is performed.

The feed of the oxidizing agent is increased (step S16). When the value of $Fe^{3+}/Fe^{2+}$ inputted from the concentration ratio calculation device 79 to the control device 80 is smaller than "1" which is the set value of $Fe^{3+}/Fe^{2+}$, for example, when the value is "0.9", the control device 80 increases the opening degree of the valve 43 so that the value of $Fe^{3+}/Fe^{2+}$ becomes "1" which is the set value, and increases the quantity of hydrogen peroxide supplied from the chemical solution tank 40 to the decomposition device 32. The steps S16, S11, S12, S13 and S15 are repeated until the determination of step S15 becomes "NO". With such control, $Fe^{3+}/Fe^{2+}$ input to the control device 80 from the concentration ratio calculation device 79 that inputs the output of the corrosion potential meter 45 eventually becomes "1", and the determination of step S15 becomes "NO". Then, the determination of step S17 is performed. When the determination of step S15 becomes "NO", the control of the increase in the opening degree of the valve 43 by the control device 80 is stopped, and the increase in the feed rate of the hydrogen peroxide to the decomposition device 32 is also stopped.

When the value of $Fe^{3+}/Fe^{2+}$ input from the concentration ratio calculation device 79 to the control device 80 is "1" which is the set value of $Fe^{3+}/Fe^{2+}$, the control device 80 controls the opening degree of the valve 43 so that the value of the input $Fe^{3+}/Fe^{2+}$ is maintained at "1" since the determination of each of the steps S13 and S15 becomes "NO".

It is determined whether the decomposition of the reduction decontamination agent is terminated (step S17). When the determination of each of the steps S13 and S14 becomes "NO", the determination in the step S17 is performed. The conductivity of the oxalic acid aqueous solution discharged from the decomposition device 32 is measured by a conductivity meter 49 disposed in the circulation piping 26 downstream of the decomposition device 32. When the measured conductivity of the oxalic acid aqueous solution decreases to the set point of conductivity, the oxalic acid level of the oxalic acid aqueous solution decreases to a 10 ppm. Since the hydrazine contained in the oxalic acid aqueous solution decomposes faster than the oxalic acid, the hydrazine concentration of the oxalic acid aqueous solution becomes "0" when the oxalic acid concentration of the oxalic acid aqueous solution decreases to 10 ppm. When the oxalate level drops to 10 ppm, the determination of step S17 becomes "YES". At this time, the feed rate control step (step S10) of the oxidizing agent is completed, and the decomposition step (step S7) of the reduction decontamination agent is completed.

Until the determination of the step S17 is "YES", the step (step S7) of decomposing the reduction decontamination agent including the ultraviolet rays irradiation step (step S8), the oxidizing agent supply step (step S9) and the oxidizing agent supply control step (step S10) is performed. In the control device 80, the steps S13 to S17 are performed.

The setting value of the concentration ratio of $Fe^{3+}$ to $Fe^{2+}$ is set to a value within the range of 0.8 to 1.0 which is described above, for example, "0.9". In the step S10 of the supply amount control of the oxidizing agent, when the determination in the step S13 becomes "YES", the control device 80 decreases the opening degree of the valve 43 so that the value of $Fe^{3+}/Fe^{2+}$ inputted from the concentration ratio calculation device 79 becomes "0.9" which is a set value, and decreases the supply amount of hydrogen peroxide from the chemical solution tank 40 to the decomposition device 32. When $Fe^{3+}/Fe^{2+}$ becomes "1" due to the reduction of the hydrogen peroxide feed rate, the determination of step S3 becomes "NO", and the hydrogen peroxide does not flow out of the decomposition device 32.

However, even after the value of $Fe^{3+}/Fe^{2+}$ becomes "1", the control device 80 reduces the opening degree of the valve 43 to reduce the quantity of hydrogen peroxide supplied to the decomposition device 32 until the value of $Fe^{3+}/Fe^{2+}$ decreases to the set value "0.9". When $Fe^{3+}/Fe^{2+}$ is reduced to "0.9", the control of the opening degree reduction of the valve 43 by the control device 80 is stopped, and the reduction of the feed rate of hydrogen peroxide is also stopped. As a result, the control of the opening degree of the valve 43 by the control device 80 is continued so that $Fe^{3+}/Fe^{2+}$ is maintained at "0.9".

Then, the determination of step S15 is performed. If the value of $Fe^{3+}/Fe^{2+}$ is lower than the set value "0.9" and the determination of the step S15 becomes "YES", the process of the step S16 is performed, and the control device 80 increases the opening degree of the valve 43. Therefore, the amount of hydrogen peroxide supplied to the decomposition device 32 also increases, and the corrosion potential of the oxalic acid aqueous solution measured by the corrosion potential meter 45 also increases. The value of $Fe^{3+}/Fe^{2+}$ also increases toward the set value of $Fe^{3+}/Fe^{2+}$. When the value of $Fe^{3+}/Fe^{2+}$ reaches the set value, the increase in the opening degree of the valve 43 by the control device 80 is stopped, and the increase in the feed amount of the hydrogen peroxide to the decomposition device 32 is also stopped. The opening degree control of the valve 43 for maintaining $Fe^{3+}/Fe^{2+}$ at "0.9" is continued. When the determination of the step S15 becomes "YES", the determination of the step S17 is performed.

When the determination of the step S17 is "YES", purification is performed (step S18). The valve 55 is opened, the valve 63 is closed, and the supply of the oxalic acid aqueous solution to the cation exchange resin column 29 is stopped. By opening the valve 61 and closing the valve 54, the oxalic acid aqueous solution is supplied from the circulation piping 26 to the cooler 48 and cooled to 60° C. or lower. At this time, since the valve 65 is opened and the valve 55 is closed, the oxalic acid aqueous solution at 60° C. is supplied to the mixed bed resin column 30. The cations and anions remaining in the oxalic acid aqueous solution are adsorbed and removed by the cation exchange resin and the anion exchange resin in the mixed bed resin column 30. Oxalic acid contained in the oxalic acid aqueous solution is also removed in the mixed bed resin column 30.

A drainage is performed (step S19). After the purification step is completed, the circulation piping 26 and a waste liquid treatment device (not shown) are connected by a high pressure hose (not shown) having a pump (not shown). The aqueous solution remaining in the recirculation system piping 6 and the circulation piping 26 is discharged from the circulation piping 26 through a high pressure hose to the waste liquid treatment device (not shown) by driving the pump, and is processed by the waste liquid treatment device.

In the process of the step S9, hydrogen peroxide is supplied to the oxalic acid aqueous solution irradiated with the ultraviolet rays, whereby $OH^-$ generated by the reaction of the formula (2) remains in the aqueous solution such as the oxalic acid aqueous solution. Therefore, $OH^-$ is discharged to the waste liquid treatment device together with the aqueous solution discharged from the circulation piping 26 in the drainage process of step S19.

After the drainage process of the step S19 is completed, the circulation piping 26 of the chemical decontamination apparatus 25 is removed from the recirculation system piping 6 to be chemically decontaminated. Thereafter, the recirculation system piping 6 is restored. After the fuel change and maintenance of the BWR plant 1 have been completed, the BWR plant 1 on which chemical decontamination has been carried out is started up in order to begin an operation in the subsequent operating cycle.

According to the present embodiment, it is possible to significantly shorten the time required for decomposition of the reduction decontamination agent. In the present embodiment, the feed rate of the oxidizing agent (e.g., hydrogen peroxide) to the decomposition device 32 can be controlled corresponding to $Fe^{3+}$ concentration ratio to $Fe^{2+}$ ($Fe^{3+}/Fe^{2+}$) determined based on the corrosive potential of the reduction decontamination aqueous solution (e.g., oxalic acid aqueous solution) discharged from the decomposition device that supplied the oxidizing agent for the reduction decontamination agent decomposition, it is possible to significantly shorten the time required for the decomposition of the reduction decontamination agent. Conventionally, an oxalic acid aqueous solution is periodically sampled on the downstream side of the decomposition device 32, and the sampled oxalic acid aqueous solution is analyzed to determine the hydrogen peroxide concentration of the oxalic acid aqueous solution discharged from the decomposition device 32. Conventionally, since the supply amount of hydrogen peroxide to be supplied to the decomposition device 32 is adjusted based on the hydrogen peroxide concentration thus determined, it takes a long time to decompose the reduction decontamination agent. In the present embodiment, it is not necessary to periodically sample the oxalic acid aqueous solution and analyze the sampled oxalic acid aqueous solution, which is conventionally performed, and moreover, to control the feed rate of the oxidizing agent to the decomposition device 32 in accordance with $Fe^{3+}/Fe^{2+}$ determined based on the corrosive potential, as described above, it is possible to significantly shorten the time required for decomposition of the reduction decontamination agent.

In the present embodiment, the control of the feed rate of the oxidizing agent to the decomposition device 32 can be automated by using the concentration ratio of $Fe^{3+}$ to $Fe^{2+}$.

it is possible to easily know whether the oxidizing agent (for example, hydrogen peroxide) is excessively supplied to the decomposition device 32 or not by determining the concentration ratio of $Fe^{3+}$ to $Fe^{2+}$. As shown in FIG. 5, when the concentration of $Fe^{3+}$ to $Fe^{2+}$ exceeds "1", the supply of the oxidizing agent to the decomposition device 32 is excessive, and the oxidizing agent flows out from the decomposition device 32. In particular, it is possible to easily know whether the oxidizing agent is flowing out from the decomposition device 32 or not by displaying the concentration ratio of $Fe^{3+}$ to $Fe^{2+}$ outputted from the concentration ratio calculation device 79 on the display device 82.

In the present embodiment, the reduction decontamination agent (for example, oxalic acid) is decomposed by irradiating ultraviolet rays to the reduction decontamination aqueous solution discharged from the recirculation system piping 6 which is the object to be reduced and decontaminated, and the oxalic acid is decomposed by the action of the catalyst in the decomposition device 32 to which the oxidizing agent is supplied. Furthermore, in the decomposition device 32, oxalate is also decomposed by OH* generated by reacting $Fe^{2+}$ with hydrogen peroxide. Therefore, in the present embodiment, the decomposition of the reduction decontamination agent is accelerated, and the time required for the decomposition thereof is also shortened.

In this embodiment, since it is determined whether the oxidizing agent flows out from the decomposition device 32 by using $Fe^{3+}$ concentration ratio to $Fe^{2+}$ or not, the outflow of the oxidizing agent from the decomposition device 32, that is, the excessive supply of the oxidizing agent to the decomposition device 32 can be grasped in a short time. As soon as $Fe^{3+}$ to $Fe^{2+}$ is greater than "1", it can be recognized that an outflow of the oxidizing agent from the decomposition device 32 has occurred.

When the obtained concentration ratio of $Fe^{3+}$ with respect to $Fe^{2+}$ is greater than "1", the control device 80 can reduce the amount of the oxidizing agent supplied to the decomposition device 32. Hence, the outflow of the oxidizing agent from the decomposition device 32 can be stopped in a short time. Therefore, deterioration of the cation exchange resin in the cation exchange resin column 29 due to the oxidizing agent can be significantly suppressed.

When the obtained concentration ratio of $Fe^{3+}$ to $Fe^{2+}$ is smaller than the set value of the concentration ratio which is "1" or less, the control device 80 can increase the amount of the oxidizing agent supplied to the decomposition device 32. Hence, the concentration ratio can be increased to the set value in a short time, and the decomposition of the reduction decontamination agent can be accelerated.

Since the corrosion potential of the reduction decontamination aqueous solution discharged from the decomposition device 32 is measured, and the concentration ratio of $Fe^{3+}$ to $Fe^{2+}$ is determined based on the measured corrosion potential, the outflow of the oxidizing agent from the decomposition device 32 can be accurately grasped, and the insufficient supply of the oxidizing agent to the decomposition device 32 can be grasped with high accuracy. As a result, it is possible to quickly cope with the outflow of the oxidizing agent from the decomposition device 32 and the shortage of the oxidizing agent supply to the decomposition device 32.

When the concentration ratio of $Fe^{3+}$ to $Fe^{2+}$ is less than the set value (the determination of the step S15 is "YES"), the supply amount of the oxidizing agent is increased (step S16), and thereafter, the determination of "whether the oxidizing agent is excessive" is performed (step S13). Hence, the supply amount of the oxidizing agent can be immediately decreased (step S14) when the concentration ratio of $Fe^{3+}$ to $Fe^{2+}$ exceeds "1" from the above-described increase in the supply amount of the oxidizing agent. Therefore, the outflow of the oxidizing agent from the decomposition device 32 can be suppressed at an early stage.

Second Embodiment

A chemical decontamination method according to Second Embodiment which is another preferred embodiment of the present invention will be described with reference to FIGS. 1, 2, 3 and 6. The chemical decontamination method of this embodiment is applied to the recirculation system piping of the BWR plants.

Figure 4:
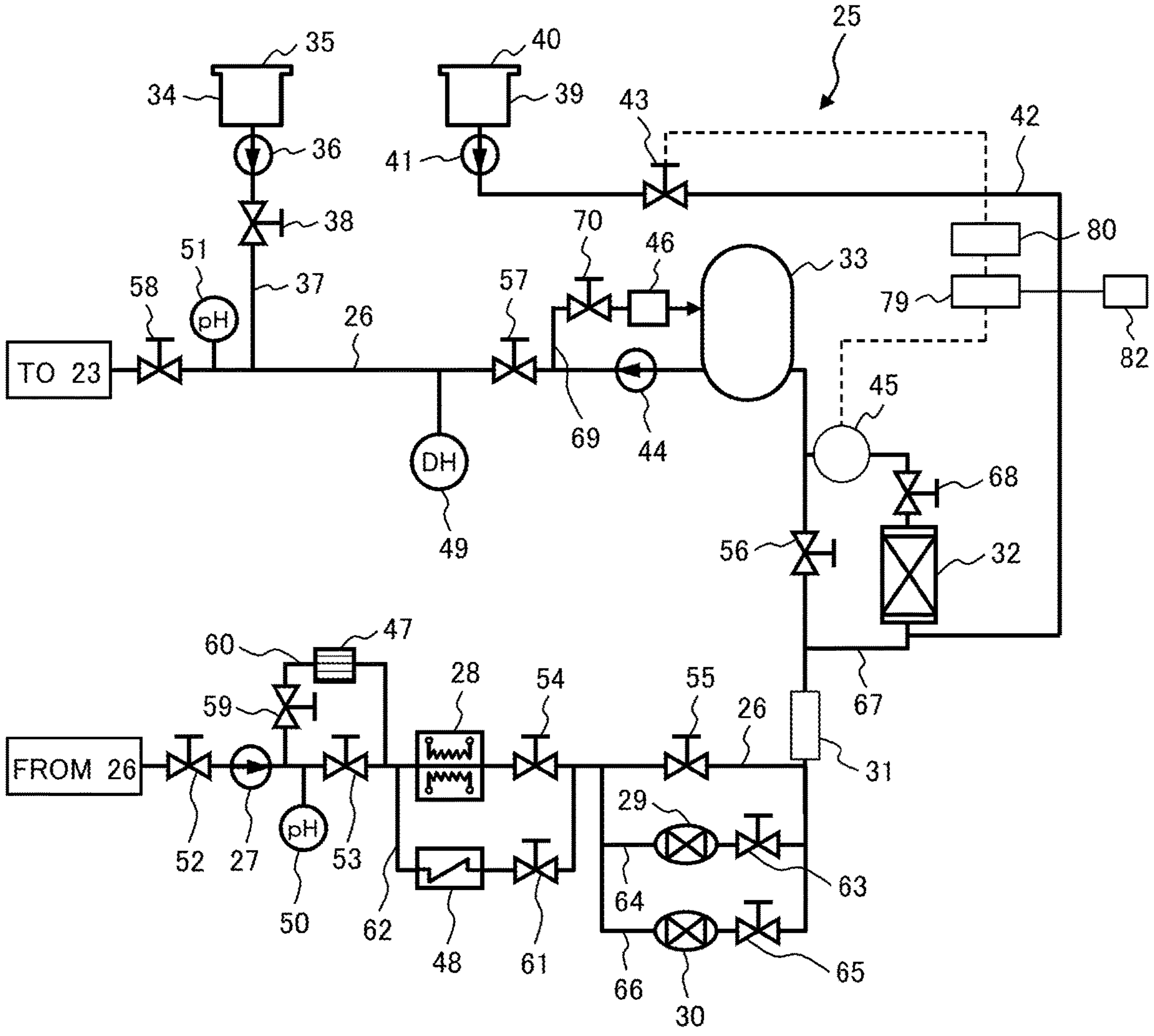
FIG. 4 is a detailed configuration diagram of the chemical decontamination apparatus shown in FIG. 3.
Figure 6:
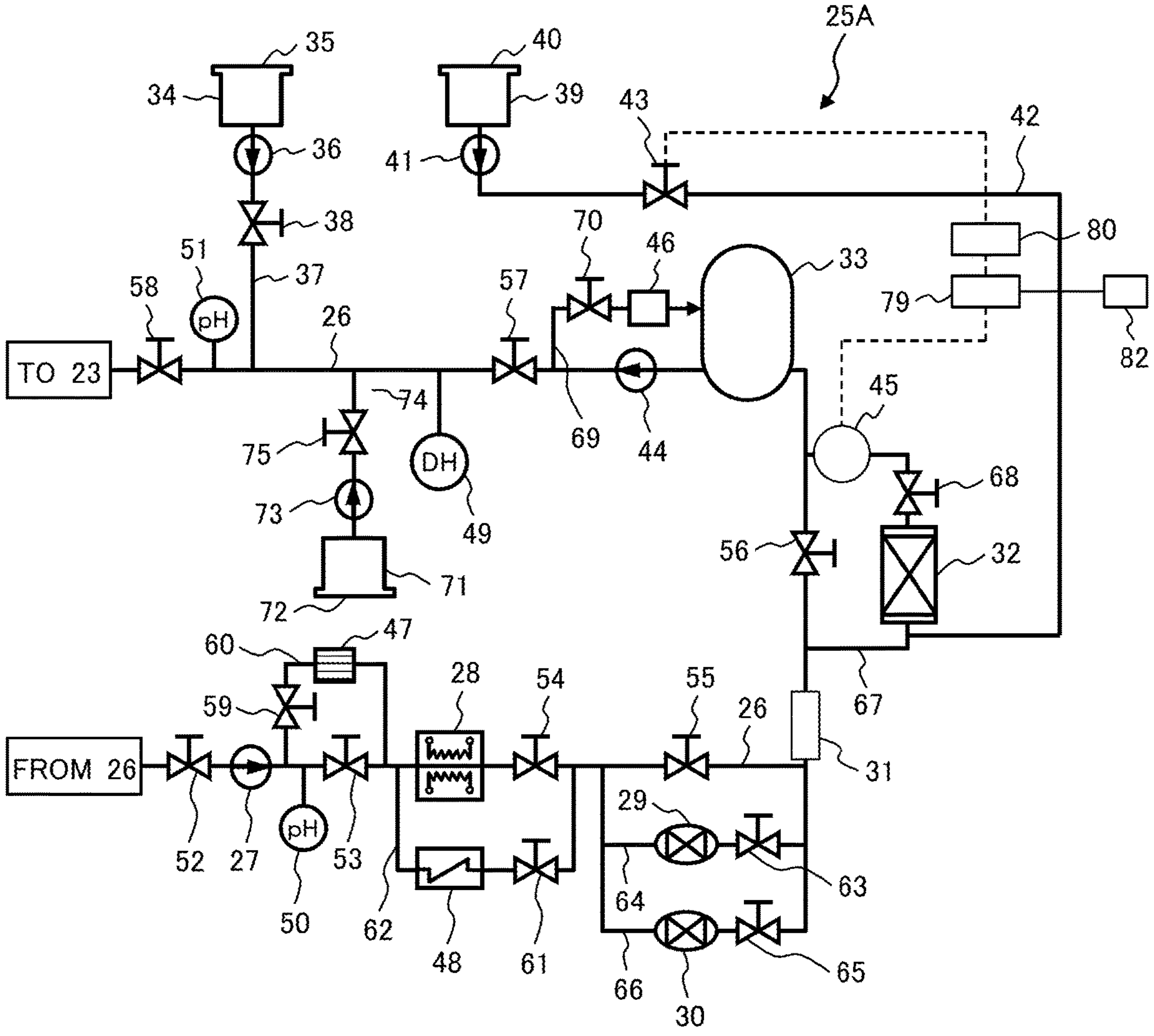
FIG. 6 is a detailed configuration diagram of a chemical decontamination apparatus used in a chemical decontamination method of Second Embodiment applied to the boiling water nuclear plant, which is another preferred embodiment of the present invention.

In the chemical decontamination method of the present embodiment, the chemical decontamination apparatus 25A procedure in FIG. 6 is used instead of the chemical decontamination apparatus 25 shown in FIG. 4 used in the First Embodiment. The chemical decontamination apparatus 25A has a configuration in which a permanganate injection device 71 is added to the chemical decontamination apparatus 25. The configuration of the chemical decontamination apparatus 25A other than the permanganate injection device 71 is the same as that of the chemical decontamination apparatus 25.

In the chemical decontamination systems 25A, the permanganate injection apparatus 71 includes a chemical solution tank 72, an injection pump 73, and an injection piping 74. The chemical solution tank 72 is connected to the circulation piping 26 by the injection piping 74 provided with an injection pump 73 and a valve 75. The injection piping 37 is connected to the circulation piping 26 between the attachment position of the conductivity meter 49 to the circulation piping 26 and the connection point between the injection piping 37 and the circulation piping 26. An permanganic acid aqueous solution which is an oxidization decontamination aqueous solution is filled into the chemical solution tank 72.

Also, in the chemical decontamination method of the present embodiment, the steps S1 to S19 shown in FIGS. 1 and 2 which are performed in the First Embodiment are respectively performed. The chemical decontamination method of the present embodiment differs from the chemical decontamination method of the First Embodiment only in the oxidization decontamination step (step S3) and the decomposition step (step S4) of the oxidization decontamination agent, and the other steps are the same. Therefore, the oxidization decontamination step (step S3) and the decomposition step (step S4) of the oxidization decontamination agent in the present embodiment will be described.

After the steps S1 and S2 are performed, the oxidization decontamination is performed (step S3). The oxidization decontamination of the inner surface of the recirculation system piping 6 of the BWR plant 1 which has experienced operation will be described. When the temperature of the water circulating in the closed loop including the recirculation system piping 6 and the circulation piping 26 reaches 90° C., the valve 75 of the permanganate injection device 71 is opened to start the injection pump 73. The permanganic acid aqueous solution in the chemical solution tank 72 is injected into the water flowing in the circulation piping 26 through the injection piping 74. The injected permanganic acid aqueous solution at 90° C. is circulated in a closed loop and oxidization decontamination is carried out on the inner surface of the recirculation system piping 6. When the oxidation decontamination time for the recirculation system piping 6 has elapsed for a predetermined time, the oxidation decontamination is terminated.

The oxidization decontamination agent contained in the oxidization decontamination solution is decomposed (step S4). The valve 70 is opened to supply the permanganic acid aqueous solution flowing in the circulation piping 26 into the surge tank 33 through the piping 69. In this state, the oxalic acid which is a decomposition agent charged into the hopper is supplied to the permanganic acid aqueous solution flowing through the piping 69 by the ejector 46. The amount of oxalic acid necessary to decompose the permanganic acid contained in the permanganic acid aqueous solution present in the closed loop is supplied from the ejector 46 to the piping 69. The supplied oxalic acid is led to the surge tank 33 through the piping 69 and dissolved in the surge tank 33. The amount of oxalic acid is supplied while the permanganic acid aqueous solution flows into the piping 69 so that the oxalic acid is uniformly mixed with the permanganic acid aqueous solution present in the closed loop.

The dissolved oxalic acid decomposes the permanganic acid contained in the permanganic acid aqueous solution. It is confirmed that the permanganic acid aqueous solution returned from the recirculation system piping 6 to the circulation piping 26 becomes colorless and transparent from the purple color, and the decomposition step of the oxidization decontamination agent is ended. After the decomposition step of the oxidization decontamination agent is completed, the oxalic acid aqueous solution having a low concentration of oxalic acid circulates in the above-described closed loop.

After the decomposition of the permanganic acid contained in the permanganic acid aqueous solution is completed in the step S4, the steps of the reduction decontamination process (step S5), the completion determination process of the chemical decontamination (step S6), the decomposition process of reduction decontamination agent (step S7), the purification process (step S18), and the drainage process (step S19) described above in the First Embodiment are performed.

In the present embodiment, each effect generated in the First Embodiment can be obtained.

Third Embodiment

A chemical decontamination method according to Third Embodiment of the present invention will be described with reference to FIG. 1, FIG. 2, FIG. 3 and FIG. 7. The chemical decontamination method of the present embodiment is applied to the recirculation system piping of the BWR plant.

Figure 7:
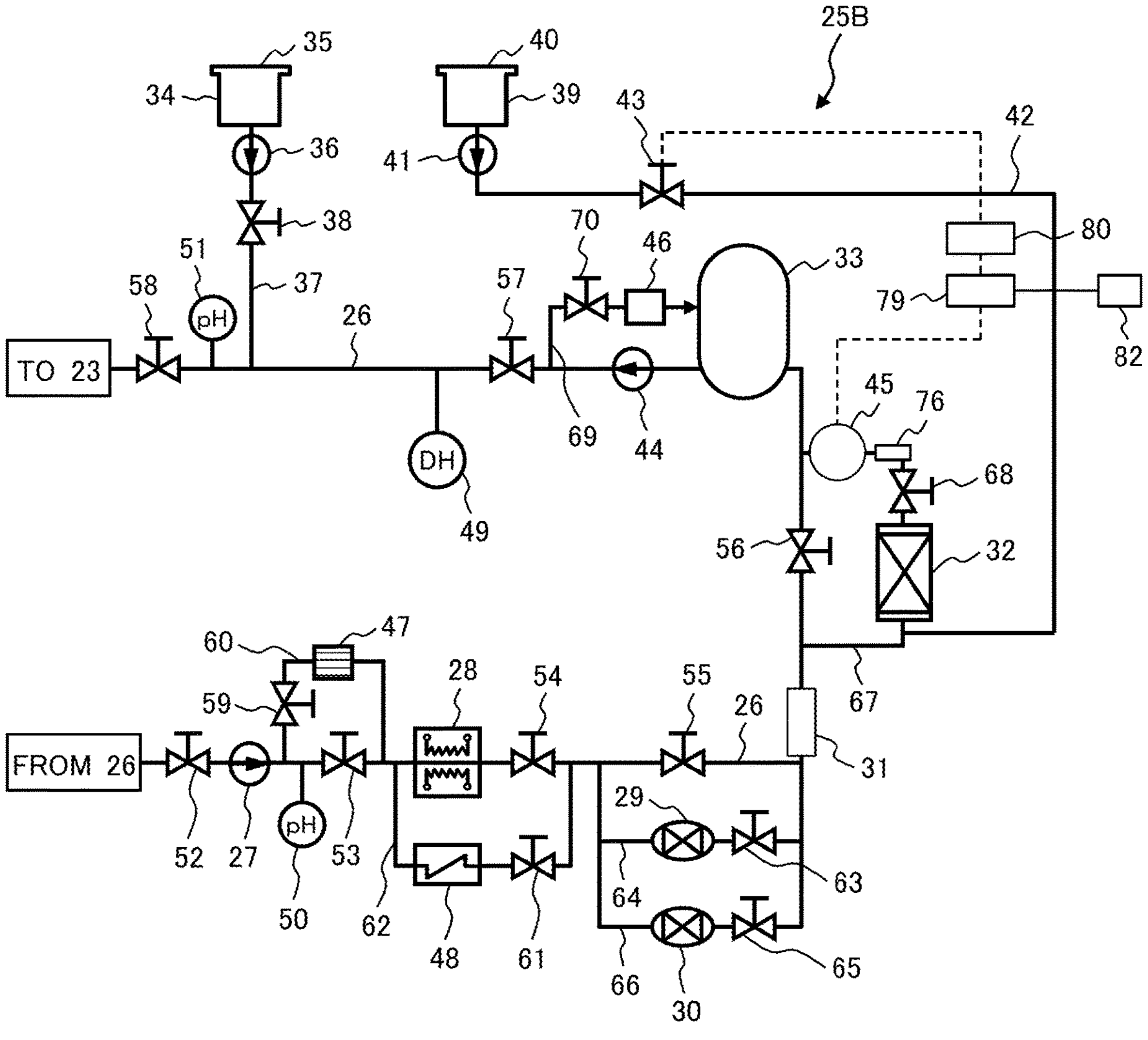
FIG. 7 is a detailed configuration diagram of a chemical decontamination apparatus used in the chemical decontamination method of Third Embodiment applied to the boiling water nuclear plant, which is another preferred embodiment of the present invention.
Figure 8:
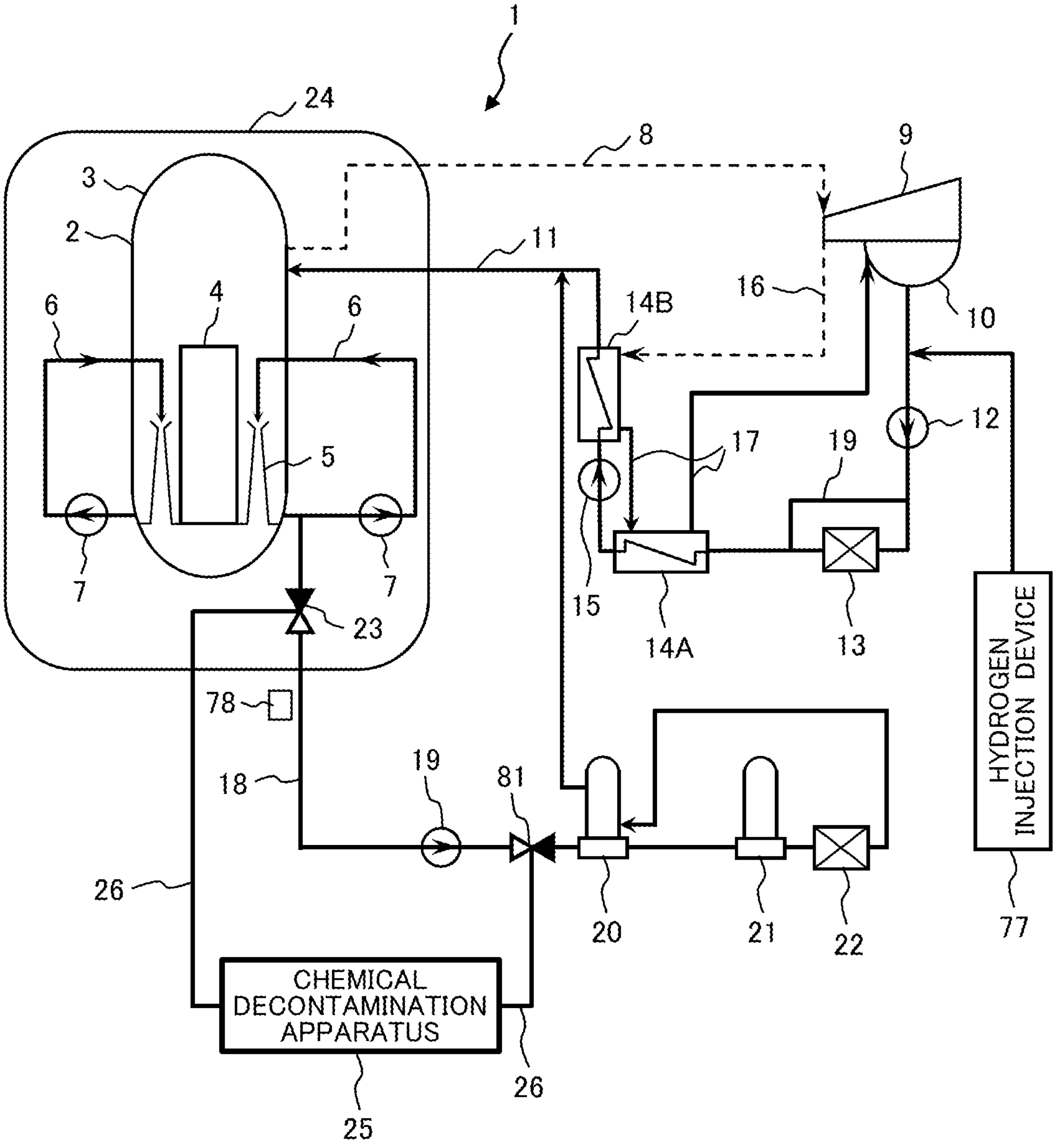
FIG. 8 an explanatory diagram showing a state in which a chemical decontamination apparatus is connected to a cleanup system piping of the boiling water nuclear plant, the chemical decontamination apparatus being used in the chemical decontamination method of Fourth Embodiment applied to the boiling water nuclear plant, which is another preferred embodiment of the present invention.

In the chemical decontamination method of the present embodiment, a chemical decontamination apparatus 25B way in FIG. 7 is used instead of the chemical decontamination apparatus 25 shown in FIG. 4 used in the First Embodiment. The chemical decontamination system 25B has a configuration in which a mixing device 76 is added to the chemical decontamination apparatus 25. The configuration of the chemical decontamination apparatus 25B other than the mixing device 76 is the same as the chemical decontamination apparatus 25.

In the chemical decontamination apparatus 25B, the mixing device 76 is disposed downstream of the valve 68 of the piping 67 and upstream of the corrosion potential meter 45 provided in the piping 67. The mixing device 76, which is not shown, has a screw-like spiral groove formed on the inner surface thereof. That is, the piping having a screw-shaped spiral groove formed on an inner surface thereof is connected as the mixing device 76 to a piping 67 existing between the valve 68 and the corrosion potential meter 45.

Also, in the chemical decontamination method of the present embodiment, the steps S1 to S19 shown in FIGS. 1 and 2 which are performed in the First Embodiment are respectively performed.

The present embodiment can obtain the respective effects generated in the First Embodiment. Further, in the present embodiment, the oxalic acid aqueous solution discharged from the decomposition device 32 is stirred by the mixing device 76 disposed in the chemical decontamination apparatus 25B, specifically, the spiral groove, so that the oxalic acid aqueous solution is uniformized. In particular, $Fe^{2+}$ and $Fe^{3+}$ contained in the oxalic acid aqueous solution are homogenized in the oxalic acid aqueous solution. Therefore, the measurement accuracy of the corrosion potential by the corrosion potential meter 45 is improved.

Fourth Embodiment

A chemical decontamination method according to a fourth embodiment of the present invention will be described with reference to FIG. 1, FIG. 2, FIG. 8 and FIG. 4. The chemical decontamination method of the present embodiment is applied to a cleanup system piping of a reactor cleanup system which is another constituent member of the BWR plant.

Also, in the chemical decontamination method of the present embodiment, the steps S1 to S19 shown in FIGS. 1 and 2 are respectively performed.

A chemical decontamination apparatus is connected to the piping system in which the chemical decontamination method is performed (step S1). Within the shutdown period of the BWR plant 1 after the operation of the BWR plant 1 is stopped, both ends of the circulation piping 26 of the chemical decontamination apparatus 25 which is a temporary facility are connected to the carbon-steel cleanup system piping 18 of the reactor cleanup system. The operation of connecting the circulation piping 26 to the cleanup system piping 18 will be specifically described. After the operation of the BWR plant 1 is stopped, for example, the bonnet of the valve 81 disposed between the cleanup system pump 19 and the regenerative heat exchanger 20 of the cleanup system piping 18 is opened to seal the regenerative heat exchanger 20 side of the bonnet. One end of the circulation piping 26 of the chemical decontamination apparatus 25, that is, an end of the circulation piping 26 on the on-off valve 52 side is connected to the flange of the valve 81. Thus, one end of the circulation piping 26 is connected to the cleanup system piping 18 upstream of the recirculation pump 7. Further, the bonnet of the valve 23 provided in the cleanup system piping 18 is opened near the connection point between the recirculation system piping 6 and the cleanup system piping 18 to seal the recirculation system piping 6 side of the bonnet. The other end of the circulation piping 26, that is, the end of the circulation piping 26 on the on-off valve 58 side is connected to the flange of the valve 23. Thus, the other end of the circulation piping 26 is connected to the cleanup system piping 18.

Thus, by connecting both ends of the circulation piping 26 to the cleanup system piping 18, a closed loop including the cleanup system piping 18 and the circulation piping 26 is formed.

Thereafter, in the present embodiment in which the cleanup system piping 18 is the object of chemical decontamination, the water filling and temperature raising step (step S2), the step of oxidization decontamination for the cleanup system piping 18 (step S3), the decomposition step of the oxidization decontamination agent (step S4), the step of reduction decontamination for the cleanup system piping 18 (step S5), the step of determining the completion of the reduction decontamination (step S6), the decomposition step of the oxidization decontamination agent (step S7), the purification step (step S18) and the drainage step (step S19) are performed in the same manner as in the First Embodiment. The determination of the completion of the reduction decontamination in step S6 is made based on the dose rate determined based on the output signal outputted from a radiation detector 78 disposed near the surface of the cleanup system piping 18.

After the drainage process of the step S19 is completed, the circulation piping 26 of the chemical decontamination apparatus 25 is removed from the cleanup system piping 18 to be chemically decontaminated. Thereafter, the cleanup system piping 18 is restored. After the fuel change and maintenance of the BWR plant 1 have been completed, the BWR plant 1 on which chemical decontamination has been carried out is started up in order to begin an operation in the subsequent operating cycle.

In the present embodiment, each effect generated in the First Embodiment can be obtained.

Fifth Embodiment

A chemical decontamination method according to Fifth Embodiment which is another preferred embodiment of the present invention will be described with reference to FIGS. 1, 3, 4, 9 and 10. The chemical decontamination method of the present embodiment is applied to the recirculation system piping of the boiling water nuclear power plant (BWR plant).

Figure 9:
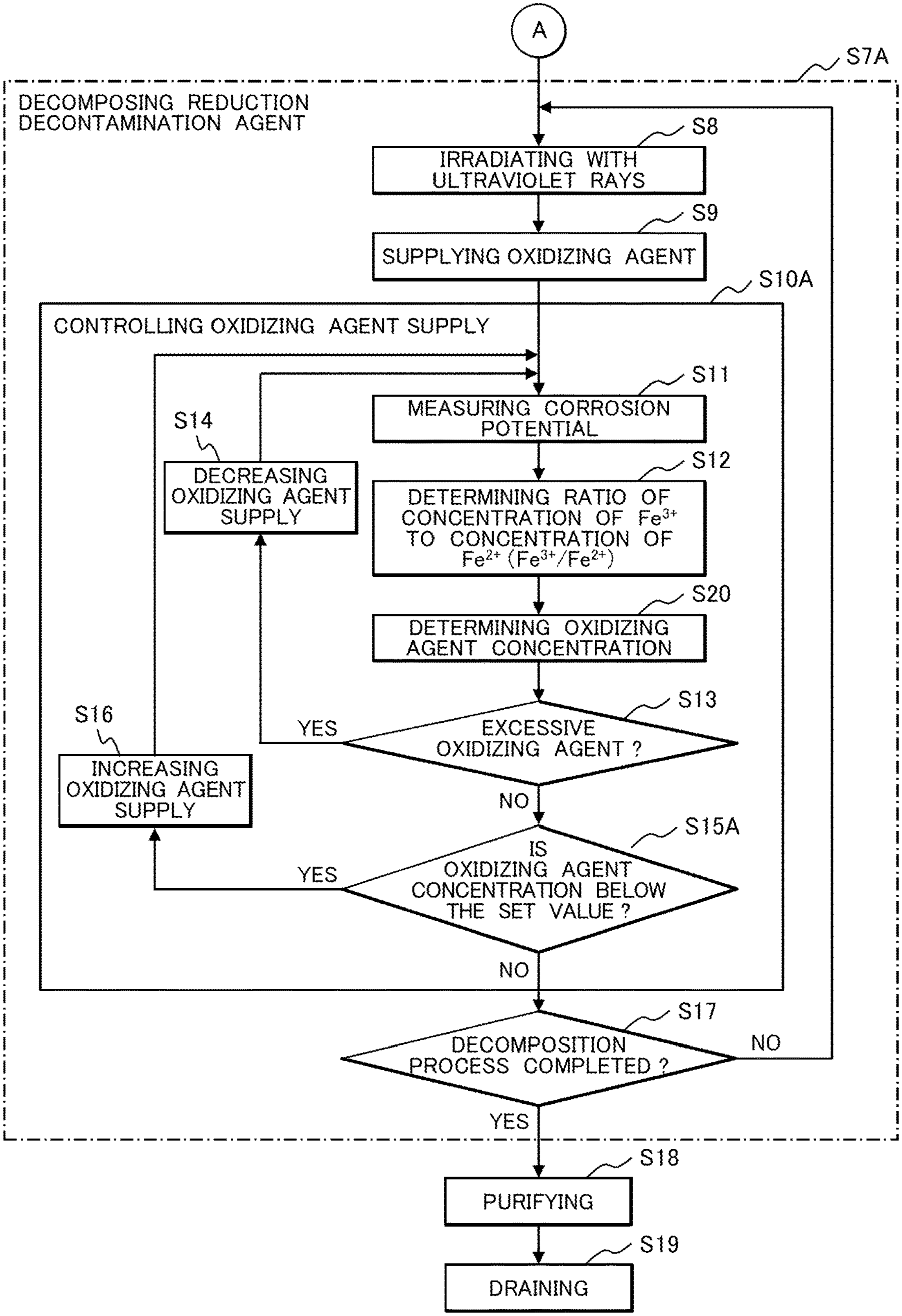
FIG. 9 is a flow chart showing the steps S7 to S20 of processes in a chemical decontamination method according to Fifth Embodiment applied to a boiling water nuclear power plant, which is another preferred embodiment of the present invention.
Figure 10:
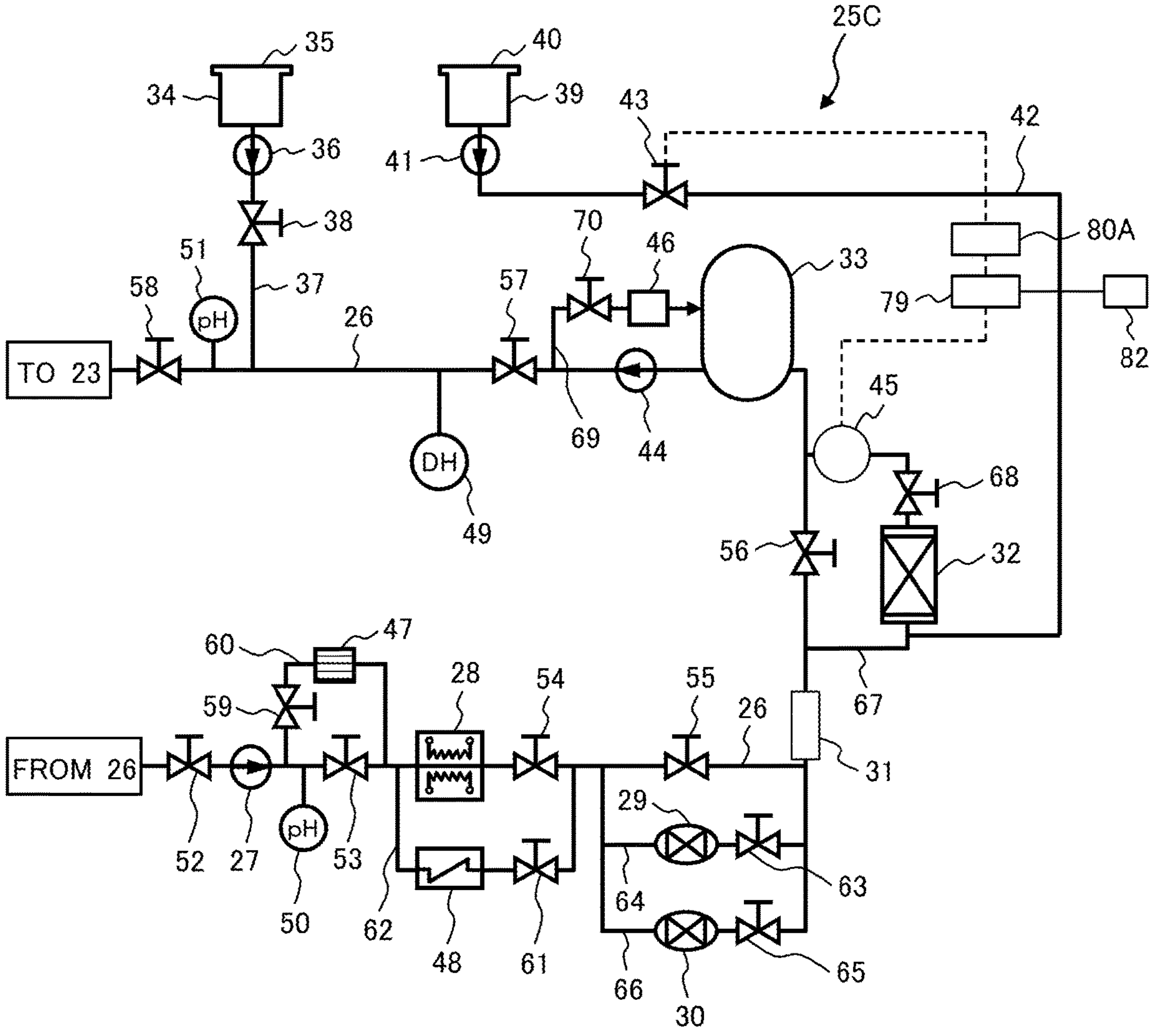
FIG. 10 is a detailed configuration diagram of the chemical decontamination apparatus used in the chemical decontamination method of the Fifth Embodiment.

In the chemical decontamination method of the present embodiment, the procedure including the steps S7 to S19 illustrated in FIG. 2 performed in the First Embodiment is changed to the procedure including the steps S7A, S8, S9, S10A, S11 to S14, S15A and S16 to S20 illustrated in FIG. 9. In the procedure illustrated in FIG. 9, the step S20 is added between the step S12 and the step S13, and the step S15A is different from the step of the First Embodiment, and is a step of determining whether the "oxidizing agent concentration is less than the set value". Further, the chemical decontamination apparatus 25C shown in FIG. 10 used in the present embodiment has a configuration in which the control device 80 is replaced with a control device 80A in the chemical decontamination apparatus 25 used in the First Embodiment. The other configurations of the chemical decontamination apparatus 25C are the same as the configurations other than the control device 80 of the chemical decontamination apparatus 25.

In the chemical decontamination method of the present embodiment, the steps S1 to S6 are performed in the same manner as in the First Embodiment. When the determination of the step S6 becomes "YES", the decomposition step of the reduction decontamination agent (step S7A) is performed. The step of decomposing the reduction decontamination agent (step S7A) includes the step of irradiating ultraviolet rays (step S8), the step of supplying hydrogen peroxide (step S9), and the step of controlling the amount of supplying hydrogen peroxide (step S10A). The step of decomposing the reduction decontamination agent (step S7A) will be detailed below.

The step of irradiating ultraviolet rays (step S8) and the step of supplying the hydrogen peroxide (step S9) are carried out in the same manner as in the First Embodiment. Thereafter, the feed rate of the oxidizing agent is controlled (step S10A). As shown in FIG. 9, the supply amount control of the oxidizing agent includes respectively the step S11 of measuring the corrosion potential, step S12 of determining the concentration ratio ($Fe^{3+}/Fe^{2+}$) of the concentration of $Fe^{2+}$ to the concentration to $Fe^{3+}$, the step S20 of determining the concentration of the oxidizing agent, the step S13 of determining whether the concentration of the oxidizing agent is excessive, the step S14 of decreasing the supply amount of the oxidizing agent, the step S15A of determining whether the concentration of the oxidizing agent is less than the set value, the step S16 of increasing the supply amount of the oxidizing agent, and the step S17 of determining whether the decomposition process is completed.

As in the First Embodiment, the steps S11 and S12 are performed. Next, the concentration of the oxidizing agent is determined (step S20). In the step S12, $Fe^{3+}/Fe^{2+}$ (concentration ratio) obtained by the concentration ratio calculation device 79 is inputted to the control device 80A. The control device 80A determines the hydrogen peroxide level of the oxalic acid aqueous solution supplied to the decomposition device 32 based on $Fe^{3+}/Fe^{2+}$. When the hydrogen peroxide concentration of the oxalic acid aqueous solution is increased by supplying hydrogen peroxide to the oxalic acid aqueous solution supplied to the decomposition device 32, the production of $Fe^{3+}$ is increased by the reaction shown in the formula (2), and the concentration of $Fe^{3+}$ of the oxalic acid aqueous solution discharged from the decomposition device 32 increases. Consequently, the corrosion potential of the oxalic acid aqueous solution discharged from the decomposition device 32 measured by the corrosion potential meter 45 increases, and $Fe^{3+}/Fe^{2+}$ of the oxalic acid aqueous solution determined based on the corrosion potential also increases.

As described above, $Fe^{3+}/Fe^{2+}$ of the oxalic acid aqueous solution discharged from the decomposition device 32 changes in proportion to the amount of hydrogen peroxide supplied to the oxalic acid aqueous solution supplied to the decomposition device 32, that is, the hydrogen peroxide concentration of the oxalic acid aqueous solution supplied to the decomposition device 32. Therefore, as will be described later, the amount of hydrogen peroxide supplied to the oxalic acid aqueous solution supplied to the decomposition device 32 can be controlled by using the hydrogen peroxide concentration of the oxalic acid aqueous solution flowing into the decomposition device 32 determined based on $Fe^{3+}/Fe^{2+}$ of the oxalic acid aqueous solution.

In the step S13, the control device 80A determines whether the quantity of hydrogen peroxide which is an oxidizing agent supplied to the decomposition device 32 is excessive, based on the determined hydrogen peroxide concentration. When the determined hydrogen peroxide concentration is greater than the peroxide concentration corresponding to "1" which is the value (concentration ratio) of $Fe^{3+}/Fe^{2+}$ (hereinafter, referred to as a first concentration set value of the hydrogen peroxide), the determination in the step S13 is "the feed of hydrogen peroxide to the decomposition device 32 is excessive", that is, "YES".

At this time, the step S14 are performed in the same manner as in the First Embodiment. That is, the supply amount of the hydrogen peroxide from the chemical solution tank 40 to the decomposition device 32 is reduced so that the concentration of the hydrogen peroxide in the oxalic acid aqueous solution supplied to the decomposition device 32 becomes the first concentration set value of the hydrogen peroxide. When the determination in the step S13 is "NO", the determination in the step S15A is performed.

It is determined whether the concentration of the oxidizing agent in the reduction decontamination aqueous solution is less than a second concentration setpoint that is less than or equal to the first concentration setpoint of the oxidizing agent (step S15A). In the step S15A, it is determined whether the concentration of hydrogen peroxide in the oxalic acid aqueous solution supplied to the decomposition device 32 determined in the step S20 is less than the second concentration set value that is equal to or less than the first concentration set value of hydrogen peroxide. In the step S15A, when "the concentration of hydrogen peroxide in the oxalic acid aqueous solution supplied to the decomposition device 32 is less than the second concentration set value", that is, when the determination of the step S15A is "YES", in the step S16, the supply amount of hydrogen peroxide from the chemical solution tank 40 to the oxalic acid aqueous solution is increased so that the concentration of hydrogen peroxide in the oxalic acid aqueous solution supplied to the decomposition device 32 becomes the second concentration set value, as in Example 1.

The steps S16, S11, S12, S20, S13 and S15A are respectively repeated until the determination of the step S15A becomes "NO". With such control, the concentration of hydrogen peroxide in the oxalic acid aqueous solution supplied to the decomposition device 32 eventually becomes the second concentration setting value, and the determination of the step S15A becomes "NO". Then, the determination of the step S17 is performed. When the determination of the step S15A becomes "NO", the control of the increase in the opening degree of the valve 43 by the control device 80A is stopped, and the increase in the feed rate of the hydrogen peroxide to the decomposition device 32 is also stopped.

When the concentration of the hydrogen peroxide in the oxalic acid aqueous solution supplied to the decomposition device 32 which is determined by the control device 80A is the second concentration setting value, the control device 80A controls the opening degree of the valve 43 so that the concentration of the hydrogen peroxide in the oxalic acid aqueous solution supplied to the decomposition device 32 is maintained at the second concentration setting value because the determination of each of the steps S13 and S15A becomes "NO".

When the determination of the step S17 becomes "YES", the decomposition step of the reduction decontamination agent (step S7A) is completed, and the steps S18 and S19 are respectively performed.

After the drainage process of the step S19 is completed, the circulation piping 26 of the chemical decontamination apparatus 25 is removed from the recirculation system piping 6 to be chemically decontaminated. Thereafter, the recirculation system piping 6 is restored. After the fuel change and maintenance of the BWR plant 1 have been completed, the BWR plant 1 on which chemical decontamination has been carried out is started up in order to begin an operation in the subsequent operating cycle.

In the present embodiment, the concentration ratio of $Fe^{3+}$ to $Fe^{2+}$ of the oxalic acid aqueous solution is determined based on the corrosion potential of the oxalic acid aqueous solution discharged from the decomposition device 32 which is measured by the corrosion potential meter 45, the concentration of the hydrogen peroxide of the oxalic acid aqueous solution flowing into the decomposition device 32 is determined based on the concentration ratio, and the amount of the hydrogen peroxide supplied to the decomposition device 32 is controlled based on the concentration of the hydrogen peroxide, so that the oxalic acid aqueous solution does not need to be sampled and analyzed, and the time required for decomposition of the reduction decontamination agent (for example, the oxalic acid) can be significantly shortened.

Further, in the present embodiment, the respective effects can be obtained other than the shortening of the decomposition time of the reduction decontamination agent generated in the First Embodiment.

Each of the permanganate injection system 71 provided in the chemical decontamination apparatus 25A used in the Second Embodiment and the mixing device 76 provided in the chemical decontamination apparatus 25B used in the Third Embodiment may be applied to the chemical decontamination apparatus 25C used in the present embodiment. Further, as shown in the Fourth Embodiment, both ends of the circulation piping 26 of the chemical decontamination apparatus 25C may be connected to the cleanup system piping 18 of the reactor cleanup system, and chemical decontamination for the cleanup system piping 18 using the chemical decontamination apparatus 25C may be performed.

Each of the First Embodiment to Fifth Embodiment can also be applied to the chemical decontamination of components of a nuclear power plant other than the BWR plant, such as a pressurized water nuclear power plant.

REFERENCE SIGNS LIST

2 . . . Reactor, 3 . . . reactor pressure vessel, 6 . . . recirculation system piping 9 . . . turbine, 11 . . . water supply piping, 18 . . . cleanup system piping, 25, 25A, 25B . . . chemical decontamination device, 26 . . . circulation piping, 27, 44 . . . circulation pump, 29 . . . cation exchange resin column, 30 . . . mixed bed resin column, 31 . . . ultraviolet rays irradiation device, 32 . . . decomposition device, 33 . . . surge tank, 34 . . . pH adjuster injection device, 39 . . . oxidizing agent supply device, 45 . . . corrosion potential meter, 71 . . . permanganate injection device, 76 . . . mixing device, 79 . . . concentration ratio calculation device, 80 . . . control device.

The invention claimed is:

1. A chemical decontamination method comprising a step of performing a reduction decontamination of a constituent member of a nuclear power plant by bringing an aqueous solution of a reduction decontamination agent into contact with a surface of the constituent member which is to be in contact with a reactor water, and thereby decomposing the reduction decontamination agent contained in the aqueous solution, wherein said step includes the steps of:

measuring a corrosion potential of the aqueous solution discharged from a decomposition device to which an oxidizing agent is supplied;

determining a concentration ratio of $Fe^{3+}$ to $Fe^{2+}$ of the aqueous solution based on the measured corrosion potential; and controlling a supply amount of the oxidizing agent to the decomposition device based on the concentration ratio.

2. The chemical decontamination method according to claim 1, wherein the determined concentration ratio is displayed.

3. The chemical decontamination method according to claim 1, wherein the aqueous solution before being supplied to the decomposition device is irradiated with ultraviolet rays.

4. The chemical decontamination method according to claim 1, wherein the reduction decontamination agent contained in the aqueous solution is decomposed by an ultraviolet rays irradiation to the aqueous solution, and the reduction decontamination agent is decomposed by a catalyst present in the decomposition device and the oxidizing agent supplied to the decomposition device.

5. The chemical decontamination method according to claim 1, wherein it is determined whether the supply amount of the oxidizing agent to the decomposition device is excessive based on the concentration ratio.

6. The chemical decontamination method according to claim 5, wherein the supply amount of the oxidizing agent to the decomposition device is determined to be excessive when the concentration ratio is greater than 1.

7. The chemical decontamination method according to claim 5, wherein the supply amount of the oxidizing agent to the decomposition device is decreased when the supply amount of the oxidizing agent to the decomposition device is excessive.

8. The chemical decontamination method according to claim 5, wherein the supply amount of the oxidizing agent to the decomposition device is increased so that the concentration ratio becomes a concentration ratio set value when it is determined that the supply amount of the oxidizing agent to the decomposition device is not excessive and it is determined that the concentration ratio is smaller than the concentration ratio set value which is 1 or less.

9. The chemical decontamination method according to claim 1, wherein the aqueous solution discharged from the decomposition device is stirred upstream of a position at which the corrosion potential is measured.

10. The chemical decontamination method according to claim 1, wherein the control of the supply amount of the oxidizing agent to the decomposition device based on the concentration ratio is that the concentration of the oxidizing agent in the aqueous solution flowing into the decomposition device is determined based on the concentration ratio, and the supply amount of the oxidizing agent to the decomposition device is controlled based on the concentration of the oxidizing agent.

11. A chemical decontamination method comprising the steps of:

forming a closed loop including a first piping and a second piping by connecting the second piping with a first piping to be chemically decontaminated, the first piping being communicated with the reactor pressure vessel and being a constituent member of a nuclear power plant, the second piping being different from the first piping; and performing a reduction decontamination on an inner surface of the second piping by supplying an aqueous solution containing a reduction decontamination agent from the second piping to the first piping, in a step of decomposing the reduction decontamination agent contained in the aqueous solution, measuring a corrosion potential of the aqueous solution connected to the second piping and returned from the first piping to the second piping, and the aqueous solution discharged from the decomposition device to which the oxidizing agent is supplied;

calculating a concentration ratio of $Fe^{3+}$ to $Fe^{2+}$ in the aqueous solution based on the measured corrosion potential; and controlling the supply amount of the oxidizing agent to the decomposition device based on the concentration ratio.

12. The chemical decontamination method according to claim 11, wherein the aqueous solution before being supplied to the decomposition device by the second piping is irradiated with ultraviolet rays.

13. The chemical decontamination method according to claim 12, wherein the reduction decontamination agent contained in the aqueous solution is decomposed by the ultraviolet rays irradiation to the aqueous solution, and the reduction decontamination agent is decomposed by a catalyst present in the decomposition device and the oxidizing agent supplied to the decomposition device.

14. A chemical decontamination apparatus comprising:

a circulation piping which is connected to a piping system of a chemical decontamination target which is a constituent member of a nuclear power plant and supplies an aqueous solution containing a reduction decontamination agent to the piping system;

a corrosion potential measuring device for measuring the corrosion potential of the aqueous solution connected to the circulation piping and discharged from the aqueous solution and the decomposition device oxidizing agent is supplied in the circulation piping;

a concentration ratio calculation device for determining a concentration ratio of $Fe^{3+}$ to $Fe^{2+}$ of the aqueous solution based on the corrosion potential measured by the corrosion potential measuring device; and a control device that controls a supply amount of the oxidizing agent to the decomposition device based on the concentration ratio determined by the concentration ratio calculation device.

15. The chemical decontamination apparatus according to claim 14, comprising an ultraviolet rays irradiation device which irradiates the aqueous solution supplied to the decomposition device with ultraviolet rays.

16. The chemical decontamination apparatus according to claim 14, comprising a mixing device which stirs the aqueous solution discharged from the decomposition device upstream of a position at which the corrosion potential is measured.

* * * * *